(12) United States Patent
Karibandi et al.

(10) Patent No.: US 11,312,607 B2
(45) Date of Patent: Apr. 26, 2022

(54) GRAPHICAL USER INTERFACE ON A KIOSK

(71) Applicant: The Coca-Cola Company, Atlanta, GA (US)

(72) Inventors: Akhil Karibandi, Marietta, GA (US); Doug McDougall, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 598 days.

(21) Appl. No.: 16/034,518

(22) Filed: Jul. 13, 2018

(65) Prior Publication Data
US 2020/0017345 A1  Jan. 16, 2020

(51) Int. Cl.
| | |
|---|---|
| *B67D 1/00* | (2006.01) |
| *G06Q 30/02* | (2012.01) |
| *G06Q 20/18* | (2012.01) |
| *B67D 1/08* | (2006.01) |
| *G06F 3/04817* | (2022.01) |

(Continued)

(52) U.S. Cl.
CPC ......... *B67D 1/0015* (2013.01); *B67D 1/0888* (2013.01); *G05B 19/042* (2013.01); *G06F 3/04817* (2013.01); *G06Q 20/18* (2013.01); *G06Q 30/0283* (2013.01); *G05B 2219/2645* (2013.01); *G06F 3/0482* (2013.01)

(58) Field of Classification Search
CPC . B67D 1/0015; B67D 1/0888; G06F 3/04817; G06F 3/0482; G05B 19/042; G05B 2219/2645; G06Q 20/18; G06Q 30/0283
See application file for complete search history.

(56) References Cited

U.S. PATENT DOCUMENTS

| | | |
|---|---|---|
| 7,578,415 B2 | 8/2009 | Ziesel et al. |
| 7,866,509 B2 | 1/2011 | Ziesel |

(Continued)

FOREIGN PATENT DOCUMENTS

| | | |
|---|---|---|
| WO | 2015167846 A1 | 11/2015 |
| WO | 2017058794 A1 | 4/2017 |

OTHER PUBLICATIONS

Coca-Cola Company, Coke Testing Self-Serve Water Station With Flavors and Bubbles, Aug. 22, 2017, 4 pages.

*Primary Examiner* — A. Hunter Wilder
(74) *Attorney, Agent, or Firm* — Meunier Carlin & Curfman LLC

(57) ABSTRACT

Upon selection of a product selection icon on a user interface of a beverage vendor, a price per amount of the product is displayed to clearly depict product costs while also providing flexibility for having products of different price points. After selection of the product and upon successful payment validation, a dispensing gauge displays an amount of product dispensed and total current cost of a dispensing session at a location of the product selection icon. A selectable dispense icon is provided upon the successful payment to facilitate dispensing the selected product and a product icon is provided proximate to the selectable dispense icon. Within the dispensing session, upon selection of a second product selection icon, the dispensing gauge moves to the second product selection icon and accumulates additional cost for the transaction based on a cost per amount of a second product associated with the second product selection icon.

10 Claims, 18 Drawing Sheets

(51) Int. Cl.
    *G05B 19/042*   (2006.01)
    *G06F 3/0482*   (2013.01)

(56) References Cited

U.S. PATENT DOCUMENTS

| | | | |
|---|---|---|---|
| 2003/0075600 A1* | 4/2003 | Struthers | G07F 9/00 |
| | | | 235/381 |
| 2007/0212468 A1 | 9/2007 | White et al. | |
| 2009/0070234 A1* | 3/2009 | Peters | G07F 9/02 |
| | | | 705/26.1 |
| 2010/0326562 A1 | 12/2010 | Sheehy et al. | |
| 2013/0106690 A1* | 5/2013 | Lim | G06F 3/04886 |
| | | | 345/173 |
| 2014/0263454 A1 | 9/2014 | Connerat et al. | |
| 2015/0039776 A1 | 2/2015 | Jarnagin, III | |
| 2015/0082243 A1 | 3/2015 | Taylor et al. | |
| 2015/0144653 A1* | 5/2015 | Kline | G07F 9/001 |
| | | | 222/23 |
| 2016/0325980 A1 | 11/2016 | Sawhney et al. | |
| 2018/0162710 A1 | 6/2018 | Moore et al. | |
| 2018/0260807 A1* | 9/2018 | Yang | G06Q 30/0601 |
| 2019/0300357 A1* | 10/2019 | Crawford | G07F 13/065 |

* cited by examiner

GRAPHICAL USER INTERFACE ON A KIOSK

BACKGROUND

Traditional post-mix beverage dispensing systems generally mix streams of syrup, concentrate, sweetener, bonus flavors, other types of flavorings, and/or other ingredients with water or other types of diluents by flowing the syrup stream down the center of the nozzle with the water stream flowing around the outside. The syrup stream is directed downward with the water stream such that the streams mix as they fall into a consumer's cup. There is a desire for a beverage dispensing system as a whole to provide as many different types and flavors of beverages as may be possible in a footprint that may be as small as possible. Recent improvements in beverage dispensing technology have focused on the use of micro-ingredients. With micro-ingredients, the traditional beverage bases may be separated into their constituent parts at much higher dilution or reconstitution ratios.

This technology is enabled via cartridges containing the highly concentrated micro-ingredients. The micro-ingredients are mixed with sweeteners and still or sparkling water using precise metering and dosing technologies and dispensed through a nozzle that promotes in-air mixing so as to prevent carry-over. The technology includes a user input for a user to select a desired beverage, customize the beverage if desired, and pour the beverage at the dispenser. These beverages are made from precise recipes to ensure a great tasting beverage regardless of the customization.

SUMMARY

According to a first aspect of the disclosure, a beverage vendor, comprises a nozzle configured to dispense one or more beverage ingredients of a beverage. The beverage vendor comprises a user interface configured to display a plurality of selectable beverage icons. The beverage vendor comprises a controller configured to receive a selection of a first selectable beverage icon of the plurality of selectable beverage icons associated with the beverage, wherein upon the selection of the first selectable beverage icon, the user interface is configured to display a cost per amount of the beverage is displayed in the first selectable beverage icon. The beverage vendor comprises a payment module configured to receive a payment for a pouring session, wherein responsive to receiving the payment, the user interface is further configured to provide a selectable pour icon on the user interface.

In some implementations of the first aspect of the disclosure, the selectable pour icon is provided on the user interface from activation of a pour icon unavailable for selection.

In some implementations of the first aspect of the disclosure, a pour icon is not presented on the user interface until the selectable pour icon is provided on the user interface.

In some implementations of the first aspect of the disclosure, the beverage vendor further comprises a pumping or metering device configured to supply a beverage ingredient from an ingredient source to the nozzle, wherein the controller is configured to activate the pumping or metering device upon a selection of the selectable pour icon to dispense the beverage from the nozzle.

In some implementations of the first aspect of the disclosure, the user interface is further configured to display a dispense gauge in the first selectable beverage icon. The dispense gauge includes a display of a total amount of product dispensed and/or a total cost of the pouring session. The dispense gauge is updated to reflect a current value for the total amount and/or the total cost as the selectable pour button is held down. The user interface is further configured to display a selected beverage icon in proximity to the selectable pour button in response to display of the dispense gauge in the first selectable beverage icon. The selected beverage icon is conjoined with the selectable pour button.

In some implementations of the first aspect of the disclosure, the controller is further configured to receive a selection of a second selectable beverage icon of the plurality of selectable beverage icons during the pouring session, Upon selection of the second selectable beverage icon, the user interface is further configured to display the dispense gauge in the second selectable beverage icon.

According to a first aspect of the disclosure, a method of dispensing a beverage from a beverage vendor comprises displaying a plurality of selectable beverage icons on a user interface of the beverage vendor. The method comprises receiving a selection of a first selectable beverage icon of the plurality of selectable beverage icons and upon receiving the selection of the first selectable beverage icon, displaying a cost per amount of a beverage associated with the first selectable beverage icon in the first selectable beverage icon. The method comprises receiving a payment for a pouring session on the beverage vendor and providing a selectable pour icon on the user interface in response to receiving the payment.

In some implementations of the second aspect of the disclosure, providing the selectable pour icon comprises activating a pour icon on the user interface that is unavailable for selection.

In some implementations of the second aspect of the disclosure, providing the selectable pour icon comprises displaying the selectable pour icon on the user interface only after receiving the payment.

In some implementations of the second aspect of the disclosure, the method further comprises supplying a beverage ingredient from an ingredient source to a nozzle on the beverage vendor upon receiving a selection of the selectable pour icon to dispense the beverage from the nozzle.

In some implementations of the second aspect of the disclosure, the method further comprises displaying a dispense gauge in the first selectable beverage icon. The dispense gauge includes a display of a total amount of product dispensed and/or a total cost of the pouring session.

In some implementations of the second aspect of the disclosure, the method further comprises updating the dispense gauge to reflect a current value for the total amount and/or the total cost as long as the selectable pour button is selected.

In some implementations of the second aspect of the disclosure, the method further comprises displaying a selected beverage icon in proximity to the selectable pour button in response to displaying the dispense gauge in the first selectable beverage icon. The selected beverage icon is conjoined with the selectable pour button.

In some implementations of the second aspect of the disclosure, the method further comprises receiving a selection of a second selectable beverage icon of the plurality of selectable beverage icons during the pouring session, and upon selection of the second selectable beverage icon, displaying the dispense gauge in the second selectable beverage icon.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
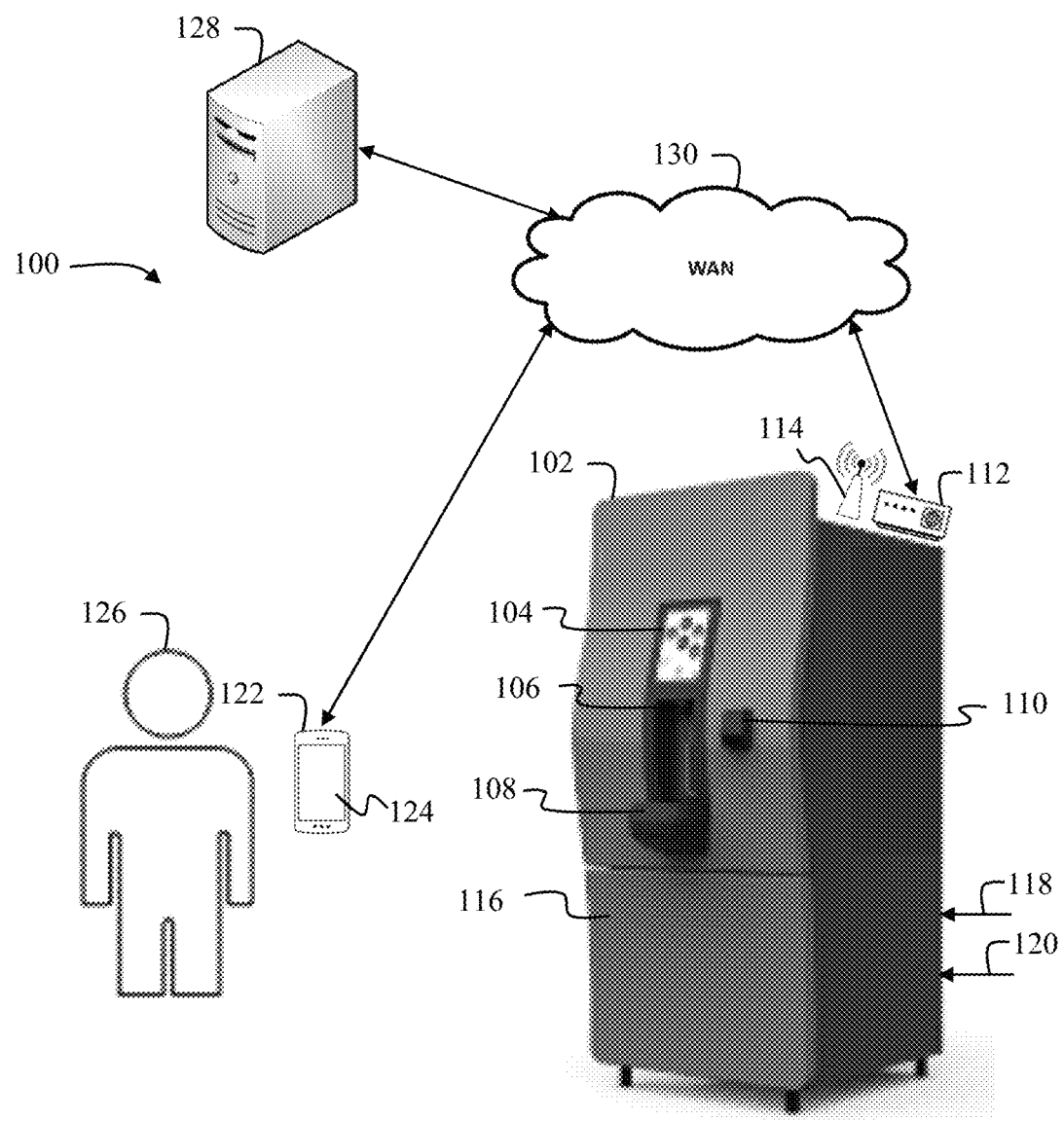
FIG. 1 illustrates an exemplary system for remote order authentication on a kiosk according to various embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Kiosks, such as beverage dispensers, vending machines, Wi-Fi access point terminals, and the like, provide products or services upon receiving payment. Many such kiosks may have a touchscreen display or other such interactive user interface that shows various graphical user interface (GUI) screens that facilitate selection, payment, and dispensing of the product or services.

In some implementations, the GUI screens may provide a plurality of selectable icons for different products to be dispensed from a dispenser. Upon selection of a desired product, a price of the product may be shown. In some implementations, the price is shown as a price per amount of product dispensed (e.g., price per fluid ounce). By indicating a price per amount of the product upon selection of the product, a user is given a clear communication of costs while also providing flexibility for having products of different price points. Additionally, by accepting payment after selection of a desired product, a consumer is notified of costs before entering into a payment session and can modify their selection accordingly, if desired.

Upon successful payment validation, a dispense GUI screen depicts a dispensing gauge that prominently displays an amount of product dispensed and total current cost of the transaction at the location of the product selection icon for the selected product. At the same time, a selectable dispense icon is unlocked to facilitate dispensing of the selected product and a product icon is conjoined with the dispense icon. In this way, a user is able to select the dispense icon to dispense a desired amount of the product and be informed in real-time of the amount and cost of the product dispensed. As the information regarding the amount and cost of product dispensed takes the place of the product selection icon, the conjoined product icon additionally reminds the user of the product that is currently selected to be dispensed. Therefore, the dispensing gauge and dispense icon with the conjoined product icon clear communication of when a product can be dispensed and what is currently selected, while at the same time showing the amount and cost of the product poured for the current transaction.

Within a single dispense transaction, the user may select and dispense products from multiple of the product selection icons. In this case, upon selecting a second product selection icon within the same dispense transaction, the dispensing gauge moves to the second product selection icon and accumulates additional cost for the transaction based on a cost per amount of a second product associated with the second product selection icon. At the same time, the conjoined product icon is also changed to indicate the product associated with the second product selection icon. Therefore, a user is able to fill a single container with a mixture of two or more products dispensed from the dispenser or to fill more than one container with different products in a single transaction, or a combination thereof.

These and other features are described in various examples detailed below with reference to the accompanying drawings. While the examples below are provided with respect to a fountain beverage vendor, these teachings can be readily applied to other types of kiosks, such as vending machines, and the like.

Described herein are example systems and methods for controlling a beverage dispensing system (such as a Coca-Cola® Freestyle®, traditional fountain dispenser, or traditional fountain dispenser with micro-ingredients). For example, a beverage dispensing system (which may include one or more macro-ingredients and/or one or more micro-ingredients) combines macro-ingredients (such as sweeteners, water, or carbonated water) and/or micro-ingredients (such as high intensity sweeteners, flavorings, food acids, or additives) to create a finished beverage. Such micro-dosing functionality may increase the dispensing capabilities of the beverage dispensing system to deliver a large variety of beverages and improve the quality of the beverage dispensed by the beverage dispensing system.

Generally described, the macro-ingredients may have reconstitution ratios in the range from full strength (no dilution) to about six (6) to one (1) (but generally less than about ten (10) to one (1)). As used herein, the reconstitution ratio refers to the ratio of diluent (e.g., water or carbonated water) to beverage ingredient. Therefore, a macro-ingredient with a 5:1 reconstitution ratio refers to a macro-ingredient that is to be dispensed and mixed with five parts diluent for every part of the macro-ingredient in the finished beverage. Many macro-ingredients may have reconstitution ratios in the range of about 3:1 to 5.5:1, including 4.5:1, 4.75:1, 5:1, 5.25:1, 5.5:1, and 8:1 reconstitution ratios.

The macro-ingredients may include sweeteners such as sugar syrup, HFCS ("High Fructose Corn Syrup"), FIS ("Fully Inverted Sugar"), MIS ("Medium Inverted Sugar"), mid-calorie sweeteners comprised of nutritive and non-nutritive or high intensity sweetener blends, and other such nutritive sweeteners that are difficult to pump and accurately meter at concentrations greater than about 10:1—particularly after having been cooled to standard beverage dispensing temperatures of around 35-45° F. An erythritol sweetener may also be considered a macro-ingredient sweetener when used as the primary sweetener source for a beverage, though typically erythritol will be blended with other sweetener sources and used in solutions with higher reconstitution ratios such that it may be considered a micro-ingredient as described below.

The macro-ingredients may also include traditional BIB ("bag-in-box") flavored syrups (e.g., COCA-COLA bag-in-box syrup) which contain all of a finished beverage's sweetener, flavors, and acids that when dispensed is to be mixed with a diluent source such as plain or carbonated water in ratios of around 3:1 to 6:1 of diluent to the syrup. Other typical macro-ingredients may include concentrated extracts, purees, juice concentrates, dairy products or concentrates, soy concentrates, and rice concentrates.

The macro-ingredient may also include macro-ingredient base products. Such macro-ingredient base products may include the sweetener as well as some common flavorings, acids, and other common components of a plurality of different finished beverages. However, one or more additional beverage ingredients (either micro-ingredients or macro-ingredients as described herein) other than the diluent are to be dispensed and mix with the macro-ingredient base product to produce a particular finished beverage. In other words, the macro-ingredient base product may be dispensed and mixed with a first micro-ingredient non-sweetener flavor component to produce a first finished beverage. The same macro-ingredient base product may be dispensed and mixed with a second micro-ingredient non-sweetener flavor component to produce a second finished beverage.

The macro-ingredients described above may be stored in a conventional bag-in-box container in, at and/or remote from the dispenser. The viscosity of the macro-ingredients may range from about 1 to about 10,000 centipoise and generally over 100 centipoises or so when chilled. Other types of macro-ingredients may be used herein.

The micro-ingredients may have reconstitution ratios ranging from about ten (10) to one (1) and higher. Specifically, many micro-ingredients may have reconstitution ratios in the range of about 20:1, to 50:1, to 100:1, to 300:1, or higher. The viscosities of the micro-ingredients typically range from about one (1) to about six (6) centipoise or so, but may vary from this range. In some instances, the viscosities of the micro-ingredients may be forty (40) centipoise or less. Examples of micro-ingredients include natural or artificial flavors; flavor additives; natural or artificial colors; artificial sweeteners (high potency, nonnutritive, or otherwise); antifoam agents, nonnutritive ingredients, additives for controlling tartness, e.g., citric acid or potassium citrate; functional additives such as vitamins, minerals, herbal extracts, nutraceuticals; and over the counter (or otherwise) medicines such as pseudoephedrine, acetaminophen; and similar types of ingredients. Various acids may be used in micro-ingredients including food acid concentrates such as phosphoric acid, citric acid, malic acid, or any other such common food acids. Various types of alcohols may be used as either macro- or micro-ingredients. The micro-ingredients may be in liquid, gaseous, or powder form (and/or combinations thereof including soluble and suspended ingredients in a variety of media, including water, organic solvents, and oils). Other types of micro-ingredients may be used herein.

Typically, micro-ingredients for a finished beverage product include separately stored non-sweetener beverage component concentrates that constitute the flavor components of the finished beverage. Non-sweetener beverage component concentrates do not act as a primary sweetener source for the finished beverage and do not contain added sweeteners, though some non-sweetener beverage component concentrates may have sweet tasting flavor components or flavor components that are perceived as sweet in them. These non-sweetener beverage component concentrates may include the food acid concentrate and food acid-degradable (or non-acid) concentrate components of the flavor, such as described in commonly owned U.S. patent application Ser. No. 11/276,553, entitled "Methods and Apparatus for Making Compositions Comprising and Acid and Acid Degradable Component and/or Compositions Comprising a Plurality of Selectable Components," which is herein incorporated by reference in its entirety. As noted above, micro-ingredients may have reconstitution ratios ranging from about ten (10) to one (1) and higher, where the micro-ingredients for the separately stored non-sweetener beverage component concentrates that constitute the flavor components of the finished beverage typically have reconstitution ratios ranging from 50:1, 75:1, 100:1, 150:1, 300:1, or higher.

For example, the non-sweetener flavor components of a cola finished beverage may be provided from separately stored first non-sweetener beverage component concentrate and a second non-sweetener beverage component concentrate. The first non-sweetener beverage component concentrate may comprise the food acid concentrate components of the cola finished beverage, such as phosphoric acid. The second non-sweetener beverage component concentrate may comprise the food acid-degradable concentrate components of the cola finished beverage, such as flavor oils that would react with and impact the taste and shelf life of a non-sweetener beverage component concentrate were they to be stored with the phosphoric acid or other food acid concentrate components separately stored in the first non-sweetener component concentrate. While the second non-sweetener beverage component concentrate does not include the food acid concentrate components of the first non-sweetener beverage component concentrate (e.g., phosphoric acid), the second non-sweetener beverage component concentrate may still be a high-acid beverage component solution (e.g., pH less than 4.6).

A finished beverage may have a plurality of non-sweetener concentrate components of the flavor other than the acid concentrate component of the finished beverage. For example, the non-sweetener flavor components of a cherry cola finished beverage may be provided from the separately stored non-sweetener beverage component concentrates described in the above example as well as a cherry non-sweetener component concentrate. The cherry non-sweetener component concentrate may be dispensed in an amount consistent with a recipe for the cherry cola finished beverage. Such a recipe may have more, less, or the same amount of the cherry non-sweetener component concentrate than other recipes for other finished beverages that include the cherry non-sweetener component concentrate. For example, the amount of cherry specified in the recipe for a cherry cola finished beverage may be more than the amount of cherry specified in the recipe for a cherry lemon-lime finished beverage to provide an optimal taste profile for each of the finished beverage versions. Such recipe-based flavor versions of finished beverages are to be contrasted with the addition of flavor additives or flavor shots as described below.

Other typical micro-ingredients for a finished beverage product may include micro-ingredient sweeteners. Micro-ingredient sweeteners may include high intensity sweeteners such as aspartame, Ace-K, steviol glycosides (e.g., Reb A, Reb M), sucralose, saccharin, or combinations thereof. Micro-ingredient sweeteners may also include erythritol when dispensed in combination with one or more other sweetener sources or when using blends of erythritol and one or more high intensity sweeteners as a single sweetener source.

Other typical micro-ingredients for supplementing a finished beverage product may include micro-ingredient flavor additives. Micro-ingredient flavor additives may include additional flavor options that can be added to a base beverage flavor. The micro-ingredient flavor additives may be non-sweetener beverage component concentrates. For example, a base beverage may be a cola flavored beverage, whereas cherry, lime, lemon, orange, and the like may be added to the cola beverage as flavor additives, sometimes referred to as flavor shots. In contrast to recipe-based flavor versions of finished beverages, the amount of micro-ingredient flavor additive added to supplement a finished beverage may be consistent among different finished beverages. For example, the amount of cherry non-sweetener component concentrate included as a flavor additive or flavor shot in a cola finished beverage may be the same as the amount of cherry non-sweetener component concentrate included as a flavor additive or flavor shot in a lemon-lime finished beverage. Additionally, whereas a recipe-based flavor version of a finished beverage is selectable via a single finished beverage selection icon or button (e.g., cherry cola icon/button), a flavor additive or flavor shot is a supplemental selection in addition to the finished beverage selection icon or button (e.g., cola icon/button selection followed by a cherry icon/button selection).

As is generally understood, such beverage selections may be made through a touchscreen user interface or other typical beverage user interface selection mechanism (e.g., buttons) on a beverage dispenser. The selected beverage, including any selected flavor additives, may then be dispensed upon the beverage dispenser receiving a further dispense command through a separate dispense button on the touchscreen user interface or through interaction with a separate pour mechanism such as a pour button (electromechanical, capacitive touch, or otherwise) or pour lever.

In the traditional BIB flavored syrup delivery of a finished beverage, a macro-ingredient flavored syrup that contains all of a finished beverage's sweetener, flavors, and acids is mixed with a diluent source such as plain or carbonated water in ratios of around 3:1 to 6:1 of diluent to the syrup. In contrast, for a micro-ingredient delivery of a finished beverage, the sweetener(s) and the non-sweetener beverage component concentrates of the finished beverage are all separately stored and mixed together about a nozzle when the finished beverage is dispensed. Example nozzles suitable for dispensing of such micro-ingredients include those described in commonly owned U.S. provisional patent application Ser. No. 62/433,886, entitled "Dispensing Nozzle Assembly," PCT patent application Ser. No. PCT/US15/026657, entitled "Common Dispensing Nozzle Assembly," U.S. Pat. No. 7,866,509, entitled "Dispensing Nozzle Assembly," or U.S. Pat. No. 7,578,415, entitled "Dispensing Nozzle Assembly," which are all herein incorporated by reference in their entirety.

In operation, the beverage dispenser may dispense finished beverages from any one or more of the macro-ingredient or micro-ingredient sources described above. For example, similar to the traditional BIB flavored syrup delivery of a finished beverage, a macro-ingredient flavored syrup may be dispensed with a diluent source such as plain or carbonated water to produce a finished beverage. Additionally, the traditional BIB flavored syrup may be dispensed with the diluent and one or more micro-ingredient flavor additives to increase the variety of beverages offered by the beverage dispenser.

Micro-ingredient-based finished beverages may be dispensed by separately dispensing each of the two or more non-sweetener beverage component concentrates of the finished beverage along with a sweetener and diluent. The sweetener may be a macro-ingredient sweetener and/or a micro-ingredient sweetener and the diluent may be water and/or carbonated water. For example, a micro-ingredient-based cola finished beverage may be dispensed by separately dispensing food acid concentrate components of the cola finished beverage, such as phosphoric acid, food acid-degradable concentrate components of the cola finished beverage, such as flavor oils, macro-ingredient sweetener, such as HFCS, and carbonated water. In another example, a micro-ingredient-based diet-cola finished beverage may be dispensed by separately dispensing food acid concentrate components of the diet-cola finished beverage, food acid-degradable concentrate components of the diet-cola finished beverage, micro-ingredient sweetener, such as aspartame or an aspartame blend, and carbonated water. As a further example, a mid-calorie micro-ingredient-based cola finished beverage may be dispensed by separately dispensing food acid concentrate components of the mid-calorie cola finished beverage, food acid-degradable concentrate components of the mid-calorie cola finished beverage, a reduced amount of a macro-ingredient sweetener, a reduced amount of a micro-ingredient sweetener, and carbonated water. By reduced amount of macro-ingredient and micro-ingredient sweeteners, it is meant to be in comparison with the amount of macro-ingredient or micro-ingredient sweetener used in the cola finished beverage and diet-cola finished beverage. As a final example, a supplemental flavored micro-ingredient-based beverage, such as a cherry cola beverage or a cola beverage with an orange flavor shot, may be dispensed by separately dispensing a food acid concentrate components of the flavored cola finished beverage, food acid-degradable concentrate components of the flavored cola finished beverage, one or more non-sweetener micro-ingredient flavor additives (dispensed as either as a recipe-based flavor version of a finished beverage or a flavor shot), a sweetener (macro-ingredient sweetener, micro-ingredient sweetener, or combinations thereof), and carbonated water. While the above examples are provided for carbonated beverages, they apply to still beverages as well by substituting carbonated water with plain water.

The various ingredients may be dispensed by the beverage dispenser in a continuous pour mode where the appropriate ingredients in the appropriate proportions (e.g., in a predetermined ratio) for a given flow rate of the beverage being dispensed. In other words, as opposed to a conventional batch operation where a predetermined amount of ingredients are combined, the beverage dispenser provides for continuous mixing and flows in the correct ratio of ingredients for a pour of any volume. This continuous mix and flow method can also be applied to the dispensing of a particular size beverage selected by the selection of a beverage size button by setting a predetermined dispensing time for each size of beverage.

FIG. 1 illustrates an exemplary system 100 for selecting and dispensing products on a kiosk 102 according to various embodiments of the disclosure. As shown, the kiosk 102 is a beverage vendor, such as a flavored water vendor. Other types of fountain beverage vendors or other types of kiosks may be used herein.

The beverage vendor 102 includes a user interface 104, a nozzle 106, a vessel support platform 108, and a payment module 110. The user interface 104 is configured to display various user interface screens to a user to select a beverage product to be dispensed from the beverage vendor 102. The nozzle is configured to dispense the selected beverage product by dispensing one or more beverage ingredients into a vessel (not shown) resting on the vessel support platform 108. The payment module 110 facilitates payment of a beverage selected from the user interface 104 in a walk-up order. That is, the walk-up order is not a pre-paid beverage product order, but is instead an order whose payment is facilitated through the beverage vendor 102.

The beverage vendor 102 also includes a product ingredient compartment 116 that is accessible through a locked door. The product ingredient compartment 116 houses one or more beverage ingredients. For example, the product ingredient compartment 116 may house one or more beverage macro-ingredients and/or micro-ingredients. The beverage vendor 102 also includes a power input 118, such as a power cord connected to a power outlet. The beverage vendor 102 also includes a water inlet 120 connected to a water source, such as a municipal water source. The product ingredient compartment 116 may also house a $CO_2$ supply and a carbonator for producing carbonated water from the water inlet and $CO_2$ from the $CO_2$ supply. A separate fluidic circuit with a fluidic supply line and one or more pumps and/or valves is connected between the nozzle 106 and each of the product ingredients and water sources.

The beverage vendor 102 also includes a modem 112 and a beacon 114. The modem 112 is configured to establish communication through a wide area network (WAN) 130 to a beverage vendor server 128. For example, the modem 112 is a cellular modem, or a local area network (LAN) modem configured to connect to an access point of the WAN 130, such as a wireless or wired gateway (not shown). The beacon 114 is configured to broadcast a unique identifier (ID) that is assigned to a particular beverage vendor 102. For example, the beacon 114 is a Bluetooth low energy (BLE) beacon, or the like. While shown in FIG. 1 as externally mounted to the beverage vendor 102, the modem 112 and/or the beacon 114 may be housed internal to the beverage vendor 102.

A mobile device 122 of a user 126 is configured to receive a beacon signal broadcast by the beacon 114 with the unique ID for the beverage vendor 102. A mobile application 123 (not shown) installed on the mobile device 122 is configured to detect the beacon signal and receive the unique ID. The mobile application 123 is configured to locate the beverage vendor 102 and facilitate completion of a pre-paid beverage product order via communication over the WAN 130 with the beverage vendor server 128. Various implementations for completing and filling a pre-paid beverage product order are described in commonly owned App. Ser. No. 62/687,344, "Remote Order Authentication on a Kiosk," filed Jun. 20, 2018, hereby incorporated by reference in its entirety for all purposes. Typically, the pre-paid beverage product order is completed at a location remote from the beverage vendor 102 and at a time prior to the user 126 coming into proximity of the beverage vendor 102. In some implementations, being within proximity of the beverage vendor 102 is at a location within a broadcast range of the beacon 114. In other words, for various implementations described herein, a mobile device 122 is determined to be proximate to the beverage vendor 102 upon receiving the beacon signal with the unique ID from the beacon 114.

Figure 2:
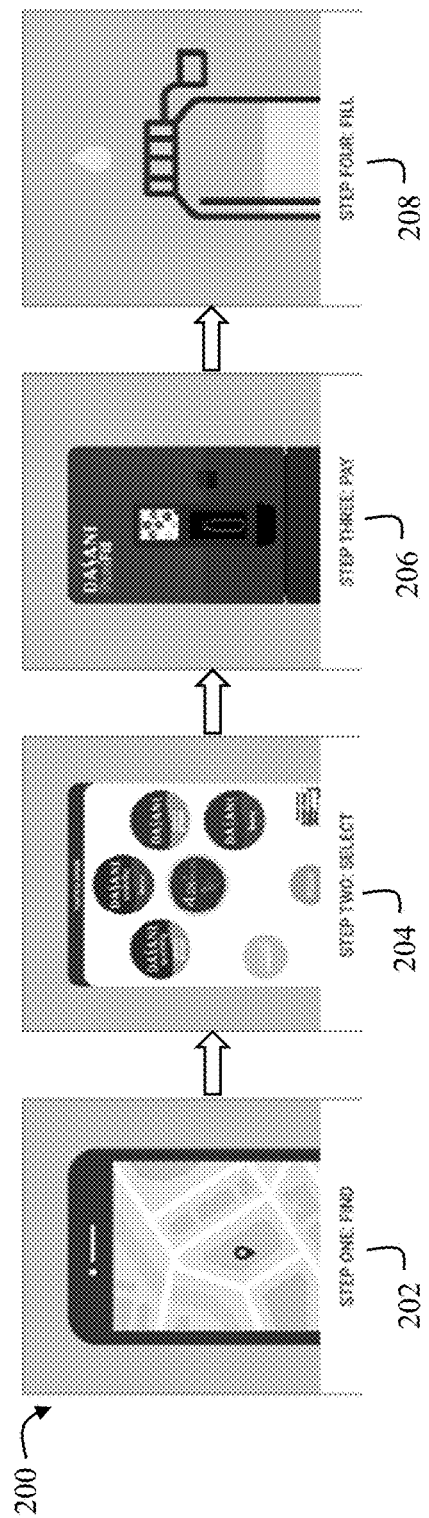
FIG. 2 illustrates an exemplary remote ordering process according to various embodiments of the disclosure.

FIG. 2 illustrates an exemplary ordering process 200 according to various embodiments of the disclosure. The ordering process 200 includes finding a desired beverage vendor 202, selecting a desired beverage to be dispensed from the desired beverage vendor 204, paying for the beverage order 206, and filling the beverage order at the desired beverage vendor 208. Various graphical user interface (GUI) screens are displayed on the user interface 104 of the beverage vendor 102 to facilitate the ordering process 200, as described in more detail below.

FIGS. 3-14 depict exemplary GUI screens displayed on the user interface 104 of the beverage vendor 102 to facilitate the ordering process 200. While unique features are described in detail with respect to each of the screens below, in the interest of brevity, common features that appear in more than one screen are described once. All common features that appear in one or more of the screens operate as described below.

Figure 3:
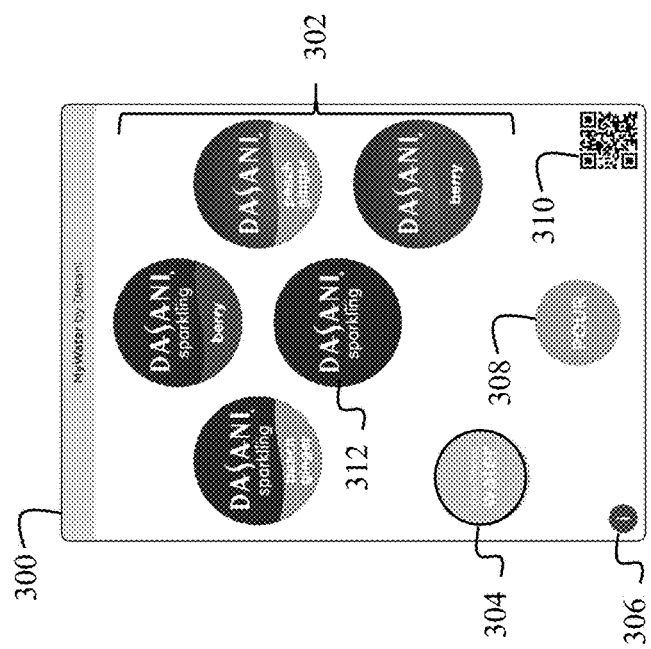
FIG. 3 illustrates an exemplary graphical user interface (GUI) screen that depicts a home screen with a plurality of selectable beverage icons according to various embodiments of the disclosure.

FIG. 3 illustrates an exemplary GUI screen that depicts a home screen 300 with a plurality of selectable beverage icons 302 according to various embodiments of the disclosure. The home screen 300 is displayed on the user interface 104 of the beverage vendor 102 to facilitate the ordering process 200 of selecting a desired beverage to be dispensed from a beverage vendor 204. A selectable water icon 304 is also provided for selecting to dispense water from the beverage vendor 102. A pour icon 308 is shown, but visually indicates that the pour icon 308 cannot be currently selected. For example, in various implementations, the pour icon 308 may be grayed-out or otherwise visually indicate unavailability of the selection. In some implementations, as opposed to being grayed-out, the pour icon 308 may simply not be shown on the home screen 300.

As discussed above in conjunction with FIG. 2 a beverage selection and payment precede filling the beverage order. Accordingly, the pour icon 308 remains in a non-selectable or otherwise unavailable state prior to selection and payment for a beverage, as discussed in more detail below. In some implementations, the pour icon 308 may be activated upon receiving a selection of the water icon 304. That is, because payment is not needed to dispense water, the pour icon 308 is activated upon a user selecting to dispense water via selection of the water icon 304.

A selectable information icon 306 may provide additional information to the user interface 104 of the beverage vendor 102 on how to use the beverage vendor 102 to proceed through the ordering process 200. Other additional information may be displayed.

A unique identifier icon 310 of the beverage vendor 102 is displayed on the home screen 300. In the example shown in FIG. 3, the unique identifier icon 310 is a QR code. Upon a user scanning the QR code using a mobile device 122 with a companion beverage vendor application 123 installed thereon, the mobile device 122 and the beverage vendor 102 are paired to interact in a customized or personalized way, such as described in commonly owned U.S. application Ser. No. 14/445,252, "Facilitating Individualized User Interaction With An Electronic Device," filed Jul. 20, 2014, and P.C.T. App. No. PCT/US2016/053961, "Dispenser Connectivity," filed Sep. 27, 2016, both of which are hereby incorporated by reference in their entirety for all purposes. For example, upon scanning the unique identifier icon 310, the beverage vendor 102 may be supplied with personalized content for facilitating an individualized interactive session on the beverage vendor 102 associated with the purchase of a beverage.

Figure 4:
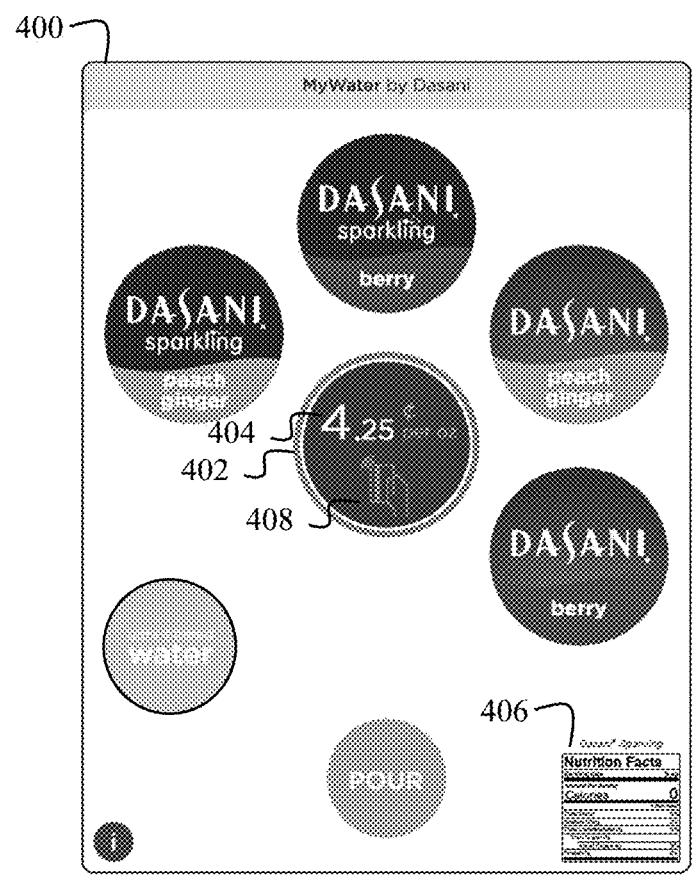
FIG. 4 illustrates an exemplary GUI screen that depicts a payment screen that displays a cost and nutritional information of a selected beverage according to various embodiments of the disclosure.

FIG. 4 illustrates an exemplary GUI screen that depicts a payment screen 400 that displays a cost 404 and nutritional information 406 of a selected beverage 402 according to various embodiments of the disclosure. For example, upon selecting selectable beverage icon 312 from the home screen 300, the payment screen 400 is displayed on the user interface 104 of the beverage vendor 102 to facilitate the ordering process 200. The depiction of the selectable beverage icon 312 is changed to include a visual highlight 402 indicative of a currently selected one of the beverage icons 302. As shown, the visual highlight 402 is depicted as a ring surrounding a location of the selected beverage icon 312. Other visual highlights may be used to indicate a current selection, such as providing a three-dimensional effect to show the current selection, changing a color of the current selection, or performing any other known method of visually highlighting the current selection.

The depiction of the unique identifier icon 310 is also changed to indicate nutritional information 406 of the selected beverage. The nutritional information 406 may depict the Nutritional Facts label of the selected beverage. The values of the nutrition information 406 may be provided on the same per amount basis as the cost (e.g., per fluid ounce), based on a nominal beverage size (e.g., 12 fl. oz.), or based on a maximum dispense size (e.g., 32 fl. oz.). Other variations to the depiction of the nutritional information 406 are contemplated by this disclosure.

The depiction of the selectable beverage icon 312 is also changed to include a cost per amount of the selected beverage 404. For example, as shown in FIG. 4, the cost is 4.25 per fluid ounce of a beverage dispensed. Other units of size (e.g., volume or weight) or currencies may be used to indicate the cost per amount of the selected beverage. By indicating a price per amount of the product upon selection of the product, a user is given a clear communication of costs while also providing flexibility for having products of different price points. Additionally, by accepting payment after selection of a desired product, a consumer is notified of costs before entering into a payment session and can modify their selection accordingly, if desired.

Additionally, the selectable beverage icon 312 is also changed to include a payment indicator 408 to notify a user to proceed with paying for the beverage order 206 in the ordering process 200. In addition to the payment indicator 408, one or more visual indicators may be activated on the payment module 110.

Figure 5:
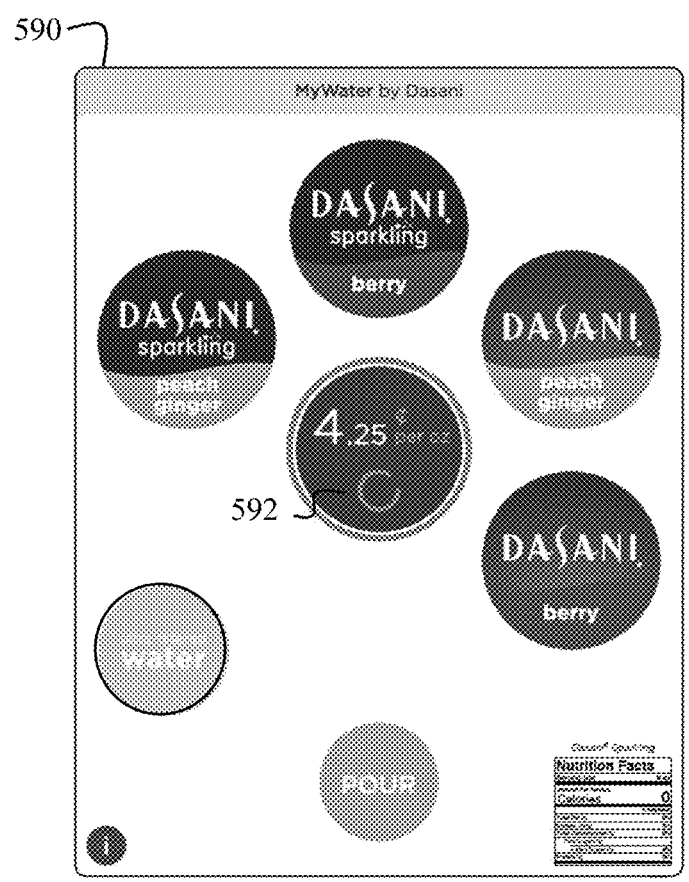
FIG. 5 illustrates an exemplary GUI screen that depicts a payment processing screen according to various embodiments of the disclosure.

FIG. 5 illustrates an exemplary GUI screen that depicts a payment processing screen 590 according to various embodiments of the disclosure. Upon a user interacting with the payment module 110 to supply a payment (e.g., swiping a credit card through a credit card reader), the payment screen 400 is updated to the payment processing screen 590 to provide visual feedback on the user interface 104 of the beverage vendor 102 that the payment is being processed. The payment indicator 408 on the payment screen 400 is updated to provide a payment processing graphic 592 in the payment processing screen 590. The payment processing graphic 592 may be a static or dynamic graphic that depicts a processing operation. In the example shown in FIG. 5, the payment processing graphic 592 is shown as a spinning line. Other graphics or icons depicting that processing is occurring may be used.

Figure 6:
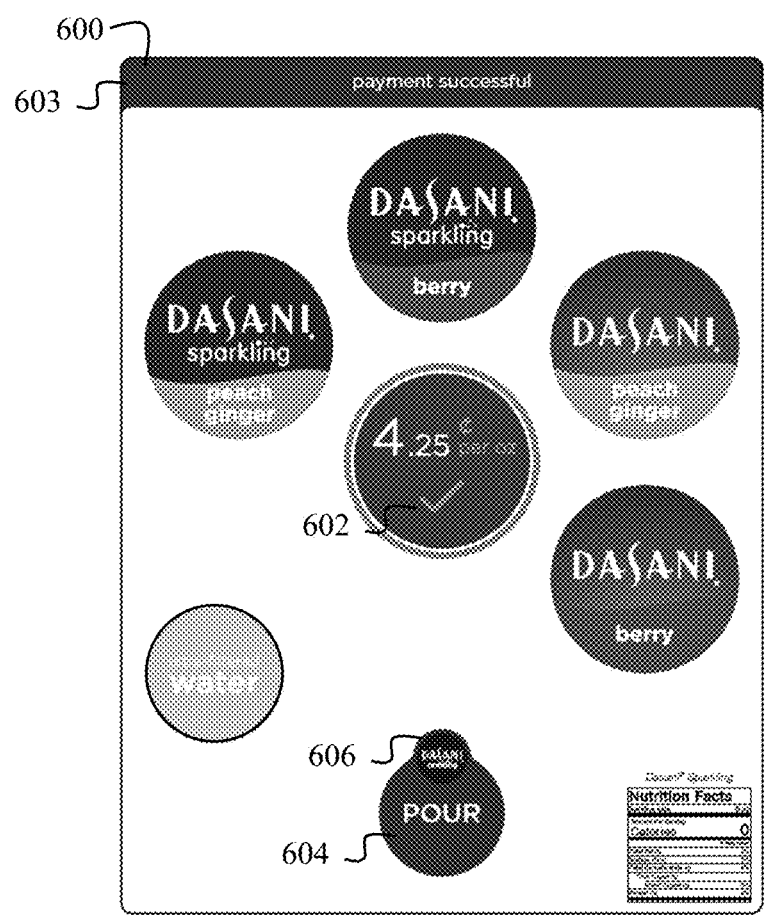
FIG. 6 illustrates an exemplary GUI screen that depicts a payment verification screen according to various embodiments of the disclosure.

FIG. 6 illustrates an exemplary GUI screen that depicts a payment verification screen 600 according to various embodiments of the disclosure. Upon validation of payment through the payment module 110, the payment processing screen 590 is updated to the payment verification screen 600 to provide visual feedback on the user interface 104 of the beverage vendor 102 of verification that the payment has been successfully processed. The payment processing graphic 592 is updated to provide a payment verification graphic 602. The payment verification graphic 602 may be a static or dynamic graphic that depicts completion of a successful processing operation. In the example shown in FIG. 6, the payment verification graphic 602 is shown as a check mark. Other graphics or icons depicting that processing is occurring may be used. A payment verification banner 603 is also displayed across the top of the payment verification screen 600 with a text verification of a successful payment. Therefore, the payment verification screen 600 includes both graphic and textual visual feedback of payment verification.

Additionally, the pour icon 308 is changed on the payment verification screen 600 to be a selectable pour icon 604. As shown in FIG. 6, a color of the selectable pour icon 604 is changed to indicate that pour icon 308 is now the selectable pour icon 604. For example, the selectable pour icon 604 is no longer grayed-out or is now visible on the payment verification screen. A selected beverage icon 606 is additionally displayed in proximity to the selectable pour icon 604 to provide a visual reminder of the currently selected beverage. For example, the selectable beverage icon 606 has a visual appearance substantially identical to the selectable beverage icon 312, though smaller in size. In the example shown in FIG. 6, the selected beverage icon 606 is conjoined with the selectable pour icon 604 to convey to a user which beverage has been selected to be poured from the beverage vendor 102.

Figure 7:
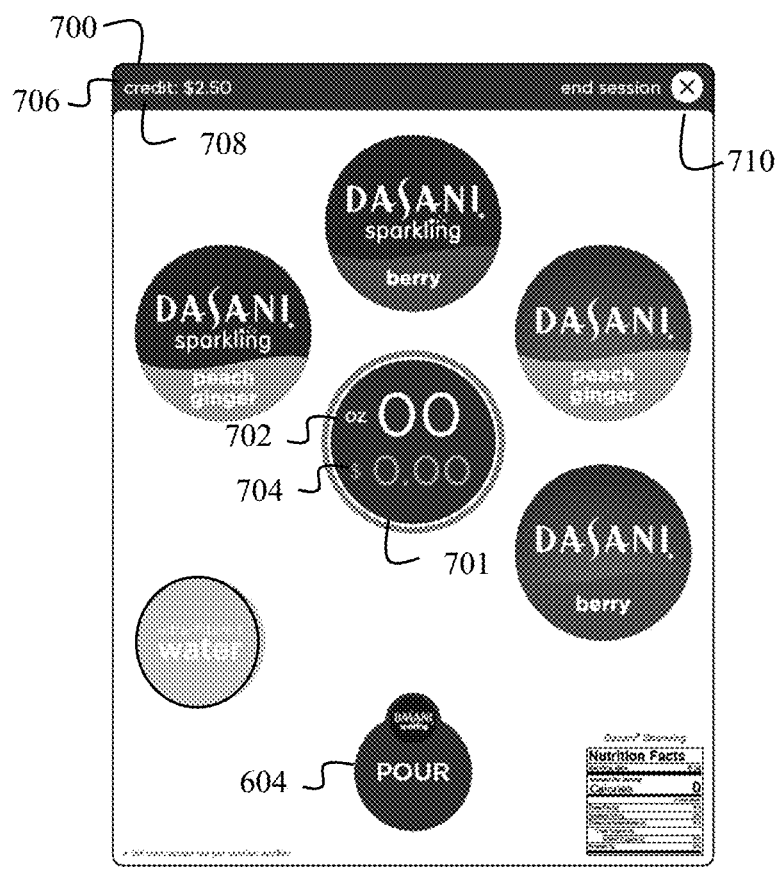
FIG. 7 illustrates an exemplary GUI screen that depicts an initial state of a pour screen according to various embodiments of the disclosure.

FIG. 7 illustrates an exemplary GUI screen that depicts an initial state of a pour screen 700 according to various embodiments of the disclosure. The pour screen 700 provides visual feedback on the user interface 104 of the beverage vendor 102 of the status of a pouring session on the beverage vendor 102. The pour screen 700 may be displayed on the user interface 104 after a time-out period (e.g., 0.5, 1, 1.5, seconds, or the like) or upon a user selecting the selectable pour icon 604. Upon receiving selection of the selectable pour icon 604, the beverage vendor 102 is configured to dispense one or more beverage ingredients to dispense the currently selected beverage from the nozzle 106. For example, as long as the selectable pour icon 604 is held down, the beverage vendor 102 will dispense the currently selected beverage from the nozzle 106, up to a predetermined maximum amount, in some implementations. Alternatively, a pour button or lever (not shown) separate from the display 104 may be used to initiate a dispense of the currently selected beverage from the nozzle 106.

The depiction of the cost per amount of the selected beverage 404 is changed to instead show a dispense gauge 701 with a total amount 702 of beverage dispensed and a total cost 704 for the pouring session. As with the cost 404, the total amount 702 and total cost 704 of the dispense gauge 701 are shown at a location of the currently selected beverage. In the example show, the depiction of the selectable beverage icon 312 is changed to include the total amount 702 and total cost 704 of the dispense gauge 701. While the amount 702 is depicted in units of fluid ounces and the cost is depicted in dollars, other units of size (e.g., volume or weight) or currencies may be used. Therefore, the dispense gauge 701 and selected beverage icon 606 icon provide clear communication of when a product can be dispensed and what is currently selected, while at the same time showing the amount and cost of the product poured for the current transaction.

Additionally, the payment verification banner 603 is updated to show a pouring session banner 706. The pouring session banner 706 includes a credit amount 708 indicative of a maximum value for the total cost 704. For example, upon the total cost 704 equaling the credit amount 708, the pouring session may be ended and the user interface 104 of the beverage vendor 102 returns to the home screen 300. The pouring session banner 706 also includes a selectable end-session icon 710 for ending the pouring session. Upon receiving selection of the end-session icon 710, the total cost 704 is charged against the credit amount 708 and the user interface 104 of the beverage vendor 102 returns to the home screen 300.

Figure 8:
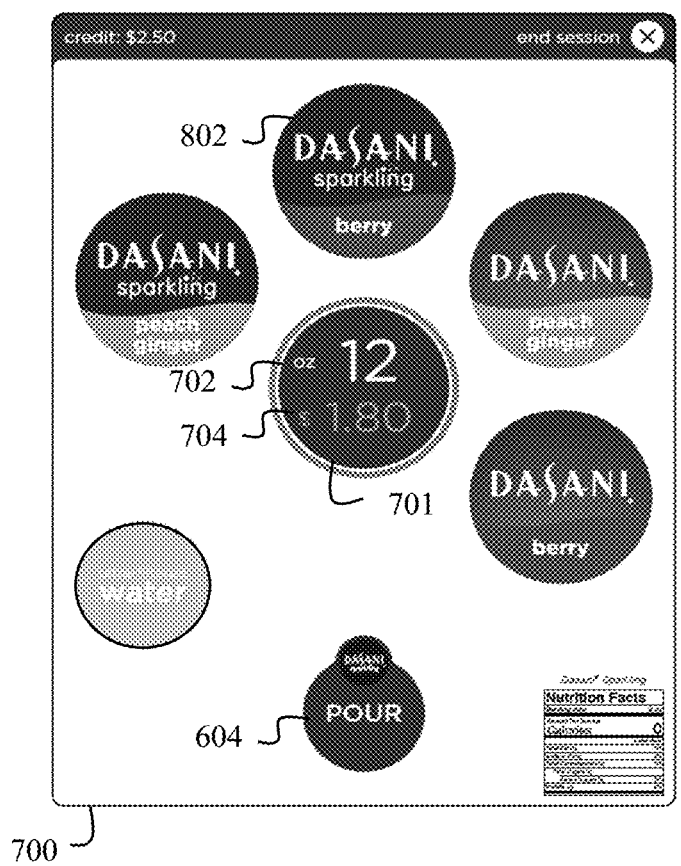
FIG. 8 illustrates an exemplary GUI screen that depicts an intermediate state of the pour screen according to various embodiments of the disclosure.

FIG. 8 illustrates an exemplary GUI screen that depicts an intermediate state of the pour screen 700 according to various embodiments of the disclosure. In the example shown, the dispense gauge 701 shows that the total amount 702 of 12 fl. oz. of a beverage have been dispensed from the beverage vendor 102 during the pouring session for the total cost 704 of $1.80. Therefore, the dispense gauge 701 periodically updates to reflect a current value for the total amount 702 and total cost 704. The dispense gauge 701 may update in real-time as the selectable pour button 604 is being held down, or on another periodic or event-based interval. For example, the dispense gauge 701 may be updated upon the selectable pour button 604 no longer being selected.

Figure 9:
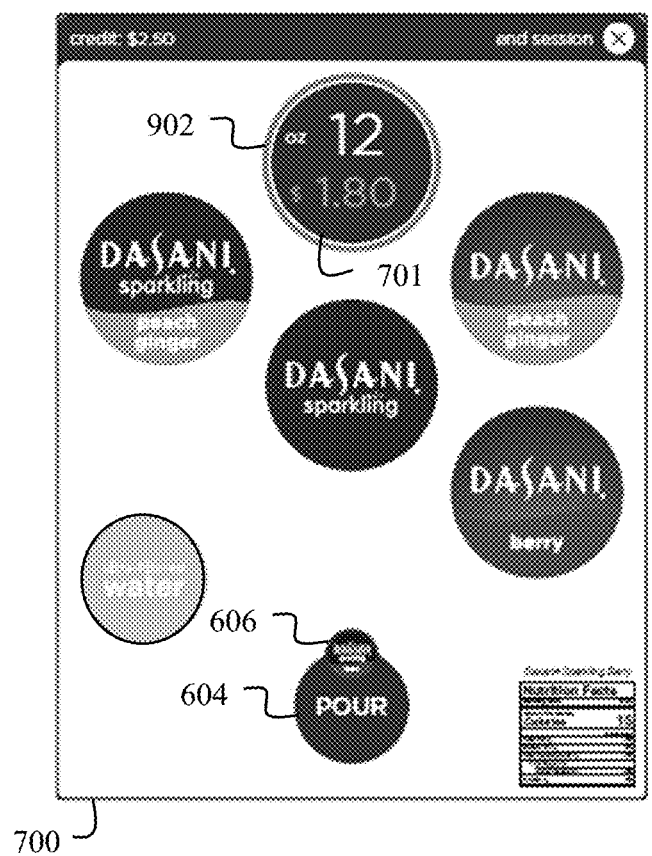
FIG. 9 illustrates an exemplary GUI screen that depicts selection of a second beverage on the pour screen according to various embodiments of the disclosure.

FIG. 9 illustrates an exemplary GUI screen that depicts selection of a second beverage on the pour screen 700 during the pouring session according to various embodiments of the disclosure. In an example, upon receiving a selection of a selectable beverage icon 802 in the pour screen 700 depicted in FIG. 8, the user interface 104 of the beverage vendor 102 is updated to show the pour screen 700 depicted in FIG. 9. While only two beverage selections are described herein, any number of beverages may be selected during the pouring session. As shown, the selectable beverage icon 802 is changed to show the dispense gauge 701 in its current state and a highlight 902 is provided to indicate the currently selected beverage icon, similar to the visual highlight 402 described above. In other words, a value of the total amount 702 and the total cost 704 are the same as the prior value shown in the dispense gauge 701 just prior to selection of the selectable beverage icon 802. Additionally, the selected beverage icon 606 is updated to identify the newly selected beverage.

Upon receiving a selection of the selectable pour button 604, the dispensing gauge 701 accumulates additional total amount 702 and total cost 704 for the transaction based on a cost per amount of a second product associated with the selectable beverage icon 802. Therefore, a user is able to fill a single container with a mixture of two or more products dispensed from the dispenser or to fill more than one container with different products in a single transaction, or a combination thereof. In various implementations, the cost per amount of the second product may be the same, more, or less, than the cost per amount of the selected beverage 404.

Figure 10:
FIG. 10 illustrates an exemplary GUI screen that depicts a sold-out state of a beverage on the pour screen according to various embodiments of the disclosure.

FIG. 10 illustrates an exemplary GUI screen that depicts a sold-out state of a beverage on the pour screen 700 according to various embodiments of the disclosure. During the dispensing session, one or more beverage ingredients for a selected beverage may be depleted or otherwise malfunction leading the beverage vendor 102 to be unable to dispense the selected beverage. In such an instance, the dispense gauge 701 may be replaced with a sold-out message 1002. Alternatively or additionally, upon receiving a selection of the selectable beverage icon 312 from the home screen 300, the sold-out message 1002 may be displayed if the selected beverage is unable to be dispensed from the beverage vendor 102.

Figure 11:
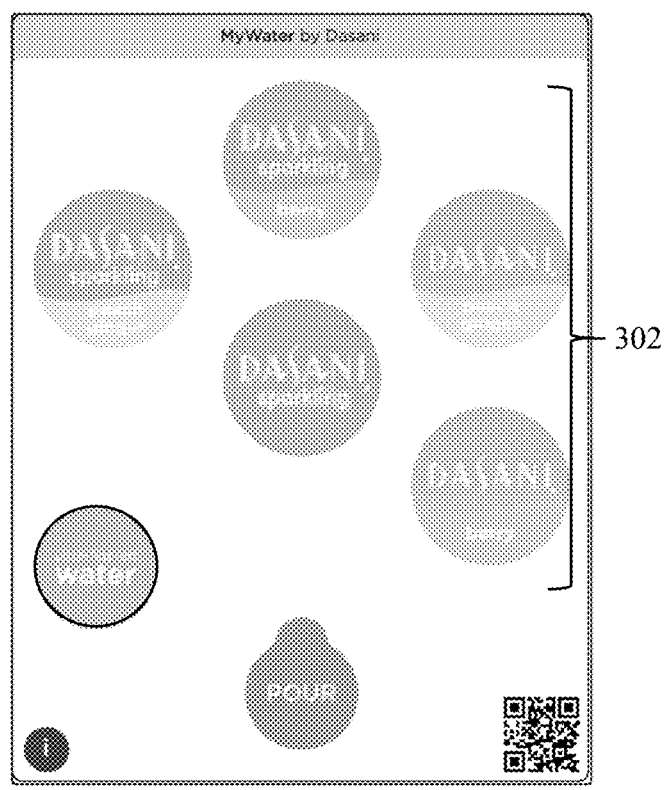
FIG. 11 illustrates an exemplary GUI screen that depicts a sold-out state of all flavored beverages on the home screen according to various embodiments of the disclosure.

FIG. 11 illustrates an exemplary GUI screen that depicts a sold-out state of all flavored beverages on the home screen 300 according to various embodiments of the disclosure. As an alternative or in addition to the sold-out message 1002 that can be displayed upon selecting a sold-out beverage, the pour screen 700 may have one or more of the selectable beverage icons 302 grayed-out to indicate that they are not available for selection. For example, as shown in FIG. 11, all of the selectable beverage icons 302 are shown as grayed-out. In various implementations, even when all of the selectable beverage icons 302 are grayed-out or otherwise made unavailable for selection, the selectable water icon 304 may still be available for selection to dispense water from the beverage vendor 102. Alternatively or additionally, one or more of the selectable beverage icons 302 may be grayed-out on the pour screen 700 for unavailable beverage.

Figure 12:
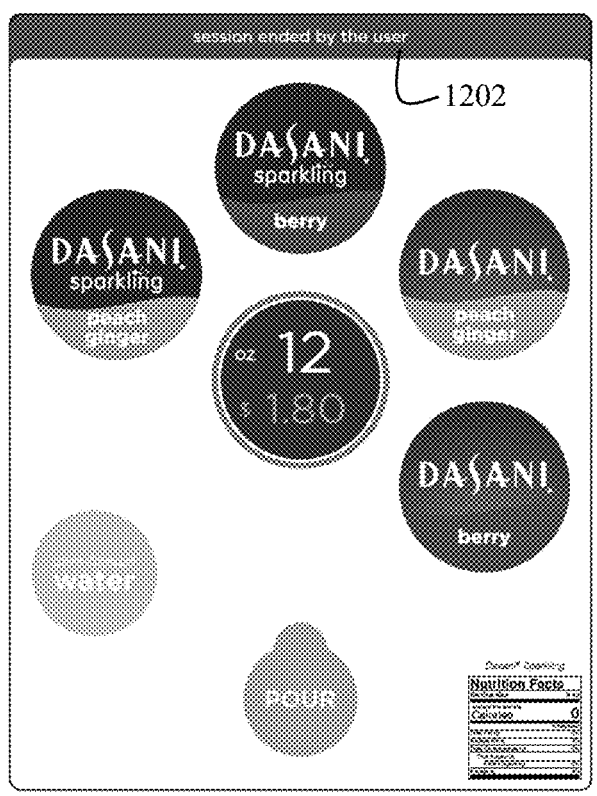
FIG. 12 illustrates an exemplary GUI screen that depicts ending a pouring session on the pour screen according to various embodiments of the disclosure.

FIG. 12 illustrates an exemplary GUI screen that depicts ending a pouring session on the pour screen 700 according to various embodiments of the disclosure. For example, upon selecting the end-session icon 710 in the pour screen 700, the pouring session banner 706 is updated to display an end-session message 1202 to provide visual verification to the user that the pouring session has ended.

Figure 13:
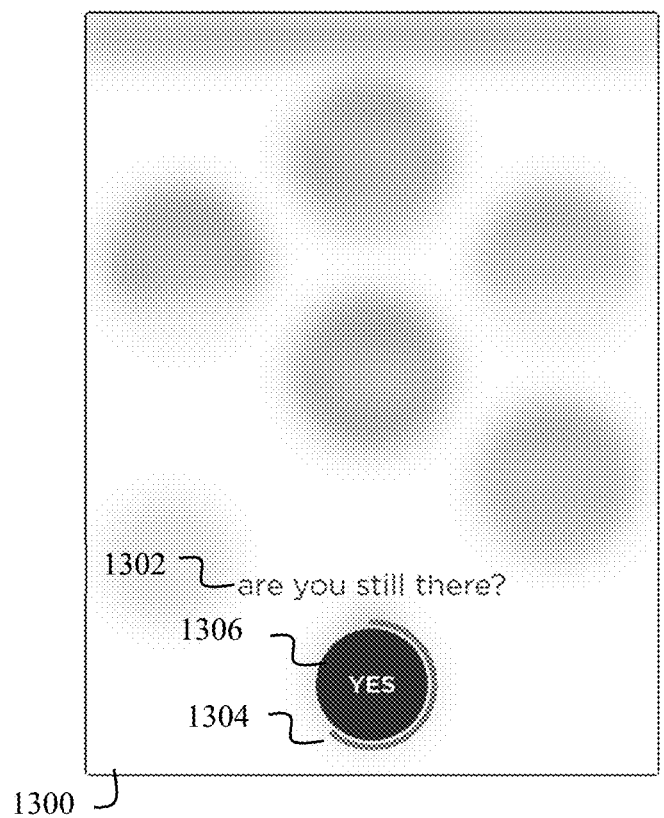
FIG. 13 illustrates an exemplary GUI screen that depicts a session verification screen according to various embodiments of the disclosure.

The pouring session may also be ended based on inactivity on the user interface 104 while displaying the pouring screen 700. Upon expiration of a predetermined period of inactivity, a session verification screen 1300 may be displayed as shown in FIG. 13. The session verification screen 1300 may overlay the pouring screen 700 and includes a message 1302 requesting verification if the user is still present to continue the pouring session. The session verification screen 1300 is displayed for a second predetermined period of time before ending the pouring session and displaying the home screen 300. A countdown graphic 1304 depicts an amount of time elapsed and/or remaining prior to the pouring session ending unless feedback is received from the user to continue the pouring session. A selectable session verification button 1306 facilitates user feedback to continue the pouring session. Upon selecting the session verification button 1306, the pour screen 700 may again be displayed in its current state.

Figure 14:
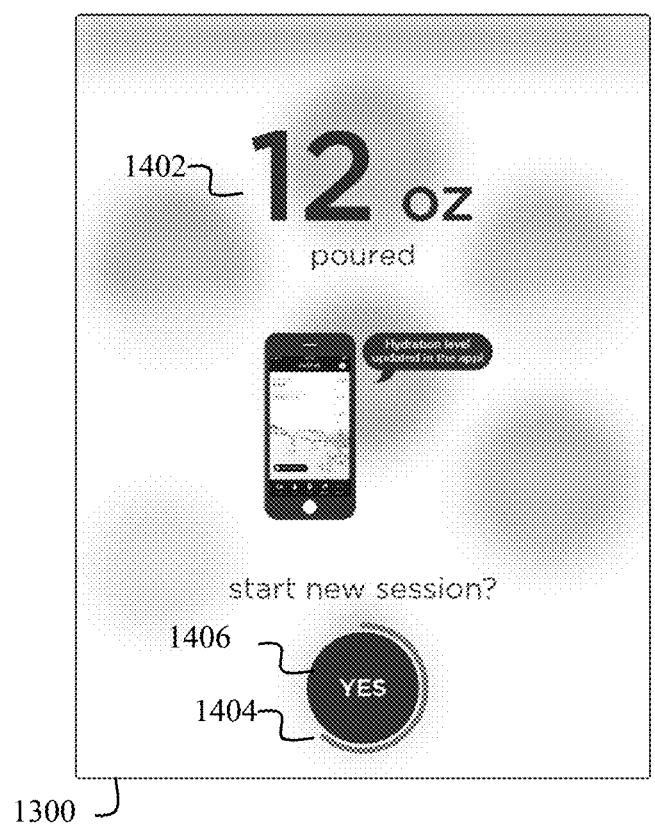
FIG. 14 illustrates an exemplary GUI screen that depicts an end-session screen according to various embodiments of the disclosure.

FIG. 14 illustrates an exemplary GUI screen that depicts an end-session screen 1400 according to various embodiments of the disclosure. Upon the pouring session ending, a total message 1402 is displayed with a value of the total amount 702 and/or the total cost 704 from the dispense gauge 701 at the end of the pouring session. In the example shown in FIG. 14, only the total amount 702 is shown in the total message 1402. The end-session screen 1400 may be displayed for a predetermined period of time prior to changing to the home screen 300. A countdown graphic 1404 depicts an amount of time elapsed and/or remaining prior to the end-session screen 1400 changing to the home screen 300. A selectable confirmation icon 1406 is used to provide user feedback to proceed with changing to the home screen 300 to start a new pouring session. Therefore, upon receiving a selection of the confirmation icon 1406, the end-session screen 1400 is changed to the home screen 300 and a new pouring session may be initiated.

Figure 15:
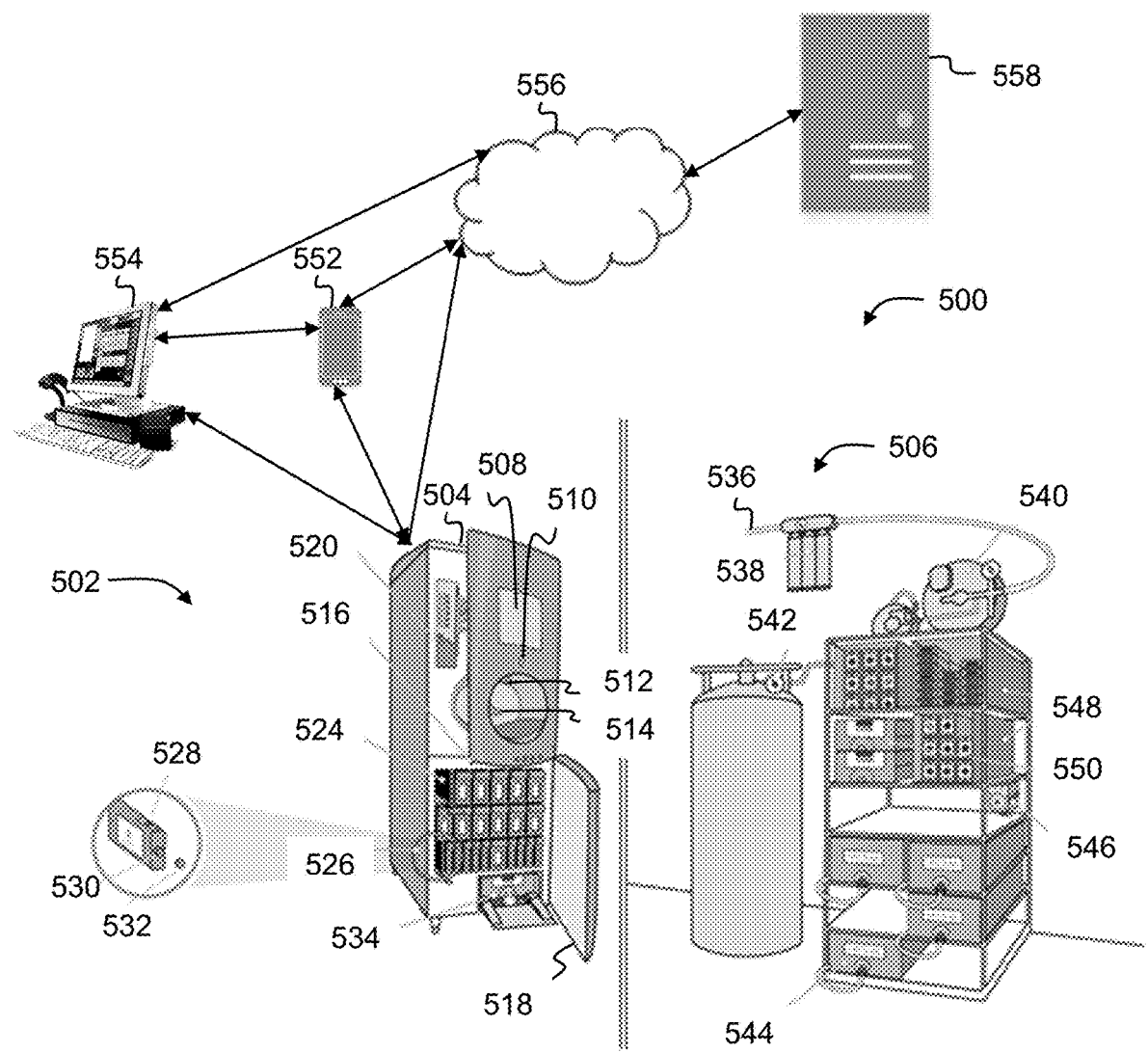
FIG. 15 illustrates an exemplary beverage dispenser system suitable for implementing the several embodiments of the disclosure.

FIG. 15 illustrates an exemplary beverage dispenser system 500 suitable for implementing the several embodiments of the disclosure. As shown, the beverage dispenser system 500 is configured as an ice cooled beverage dispenser. Other configurations of beverage dispensers are contemplated by this disclosure such as a drop-in ice-cooled beverage dispenser, a counter electric beverage dispenser, a remote recirculation beverage dispenser, or any other beverage dispenser configuration.

The beverage dispenser system 500 includes a front room system 502 with a beverage dispenser 504 and a back-room system 506. The beverage dispenser 504 includes a user interface 508, such as a touchscreen display, to facilitate selection of the beverage to be dispensed. The user interface 508 may employ various screens to facilitate user interactions on the beverage dispenser 504 and/or receive a user profile through interaction with a user's mobile device 552, such as described in commonly owned U.S. patent application Ser. No. 14/485,826, entitled "Product Categorization User Interface for a Dispensing Device," which is herein incorporated by reference in its entirety.

Upon receiving a beverage selection via the user interface 508, a pour button 510 may be activated to dispense the selected beverage from the beverage dispenser 504 via a nozzle 514. For example, the pour button 510 may be an electromechanical button, capacitive touch button, or other button selectable by a user to activate the beverage dispenser 504 to dispense a beverage. While shown as a button, the pour button 510 may alternatively be implemented as a lever or other mechanism for activating the beverage dispenser 504 to dispense a beverage. As shown in FIG. 15, the pour button 510 is separate from the user interface 508. In some implementations, the pour button 510 may be implemented as a selectable icon in the user interface 508.

In some implementations, the beverage dispenser may also include an ice lever 514. Upon being activated, the ice lever 514 may cause the beverage dispenser 504 to dispense ice through an ice chute (not shown). For beverage dispensers that do not have an ice bin, such as counter-electric or remote recirculation beverage dispensers, the ice lever 514 may be omitted.

The beverage dispenser 504 may be secured via a primary door 516 and an ingredient door 518. The primary door 516 and the ingredient door 518 may be secured via one or more locks. In some implementations, the locks are a lock and key. In some implementations, the lock on the ingredient door 518 may be opened via an RFID reader (not shown) reading an authorize ingredient package 528. The primary door 516 may secure electronic components of the beverage dispenser 504 including one or more controllers 520. The ingredient door 518 may secure an ingredient compartment that houses an ingredient matrix 524.

The ingredient matrix 524 includes a plurality of slots 526 for receiving ingredient packages 528. In various implementations, the ingredient packages 528 may be micro-ingredient cartridges. The micro-ingredient cartridges may be single cartridges or double cartridges, such as described in commonly owned U.S. patent application Ser. No. 14/209,684, entitled "Beverage Dispenser Container and Carton," and U.S. patent application Ser. No. 12/494,427, entitled "Container Filling Systems and Methods," which are both herein incorporated by reference in their entirety. As shown in FIG. 15, there are three drawers of ingredients in the ingredient matrix 524. One or more of the drawers may slide back and forth along a rail so as to periodically agitate the ingredients housed on the drawer. Other configurations of the ingredient matrix 524 are possible, such as via one or more static and/or agitated ingredient towers.

Each ingredient package 528 may comprise an RFID tag, a fitment 530, and a fitment seal 532. The fitment seal 532 may be removed prior to installation into the beverage dispenser 504. Upon installation, the fitment 530 may engage with and provide a fluidic communication between a probe (not shown) in the slot 526 and the ingredients contained in the ingredient package 528. The ingredient matrix 524 may also contain one or more large volume micro-ingredient packages 534, such as for one or more micro-ingredient sweetener sources.

The beverage dispenser 504 may also include a carbonator (not shown) for receiving water and carbon dioxide to produce carbonated water. The beverage dispenser 504 may also include one or more heat exchangers (not shown), such as a cold plate, for cooling one or more of the beverage ingredients contained in or received by the beverage dispenser 504. In some implementations, one or more of the micro-ingredients dispensed via the nozzle 512 are not cooled via the heat exchanger or are otherwise maintained at an ambient temperature. Macro-ingredients dispensed via the nozzle 512 are typically cooled via the heat exchanger prior to being dispensed.

The back-room system 506 is typically located in a back room remote from the front room system 502, such as a storage area in a merchant location. The back-room system 506 includes a water source 536 such as a municipal water supply that provides a pressurized source of plain water. The water received via the water source 536 may be filtered or otherwise treated by a water treatment system 538. The treated water may optionally be pressurized to a desired pressure with a water booster 540 and supplied to the beverage dispenser. A carbon dioxide source 542 may supply carbon dioxide to the beverage dispenser 504.

One or more macro-ingredient sources 544 may be located in the back room. The macro-ingredient from each macro-ingredient source 544 may be supplied to the beverage dispenser 504 via a pump 546. The pump 546 may be a controlled gear pump, diaphragm pump, BIB pump, or any other suitable pump for supplying macro-ingredients to the beverage dispenser 504. The back-room system 506 may also include a rack with one or more storage locations 548 for spare micro-ingredients and one or more storage locations 550 for spare macro-ingredients.

In some implementations, one or more features of the back-room system 506 may be integrated into the beverage dispenser 504. In some implementations, a back-room system 506 may not be provided.

The beverage dispenser 504 may include one or more network interfaces for communicating directly with devices in the front room or the back room, communicating with devices in the front room or the back room in a local area network (LAN), or communicating with devices remote from a location with the beverage dispenser system 500 via a wide area network (WAN) connection. For example, the beverage dispenser 504 may include networking devices such as a near field communication (NFC) module, a BLUETOOTH module, a WiFi module, a cellular modem, an Ethernet module, and the like. The beverage dispenser 504 may communicate via a direct communication or via a LAN with a user's mobile device 552 or a point-of-sale (POS) device 554 to receive a beverage selection or user profile of a user for configuring the beverage dispenser 504 to dispense one or more beverages based on the beverage selection or user profile. The user profile may include stored favorite beverages for the user, mixed or blended beverages created or stored by the user in their profile, and/or one or more beverage preferences, such as preferred nutritive level. The beverage dispenser 504 may also communicate via a WAN 556 for communicating with one or more remote servers 558 to receive software updates, content updates, user profiles, or beverage selections made via the remote server 558.

Figure 16:
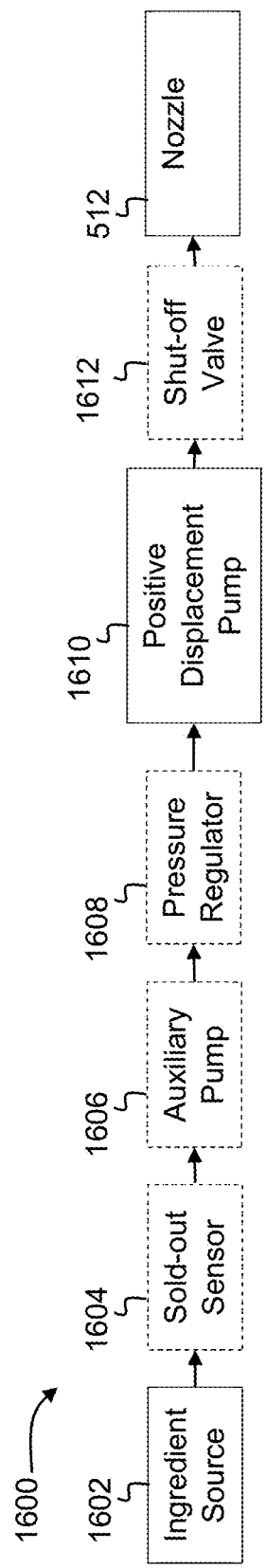
FIG. 16 illustrates an exemplary fluidic circuit with a positive displacement pump suitable for implementing the several embodiments of the disclosure.
Figure 17:
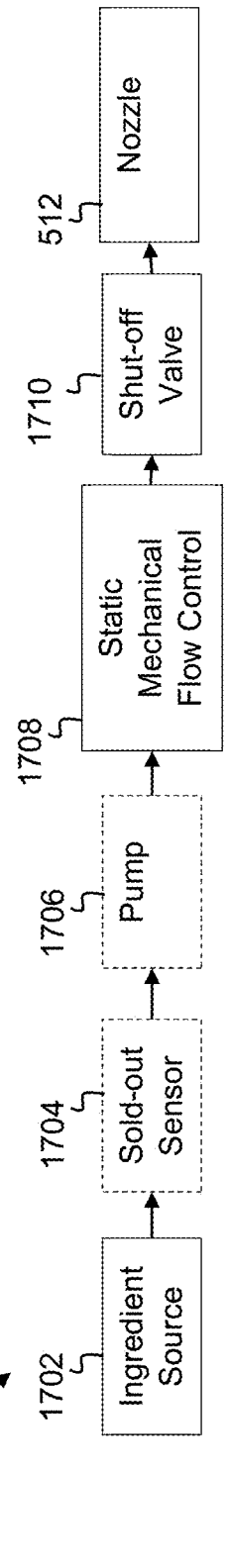
FIG. 17 illustrates an exemplary fluidic circuit with a static mechanical flow control suitable for implementing the several embodiments of the disclosure.
Figure 18:
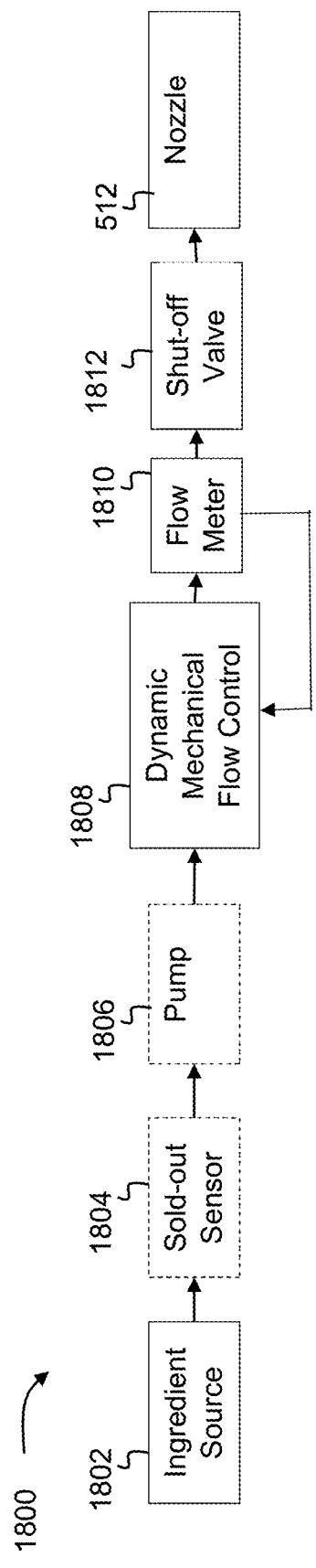
FIG. 18 illustrates an exemplary fluidic circuit with a dynamic mechanical flow control and flow meter suitable for implementing the several embodiments of the disclosure.

FIGS. 16-18 illustrate exemplary fluidic circuits 1600-1800 with pumping or metering devices from ingredient sources 1602, 1702, 1802 to the nozzle 512 of the beverage dispenser 504. The beverage dispenser 504 may include none, one, or a plurality of the fluidic circuits shown in FIGS. 16-18. For each ingredient source, the beverage dispenser 504 may include one of the fluidic circuits shown in FIGS. 16-18.

FIG. 16 illustrates an exemplary fluidic circuit 1600 with a positive displacement pump 1610 suitable for implementing the several embodiments of the disclosure. The fluidic circuit 1600 provides a fluid path from the ingredient source 1602 to the nozzle 512. The ingredient source 1602 may be a micro-ingredient source or a macro-ingredient source housed in the ingredient matrix 524 of the beverage dispenser 504, remote from the beverage dispenser 504 in the front room (e.g., adjacent to the beverage dispenser 504 or under a counter on which the beverage dispenser 504 is located), or located in the back room. The positive displacement pump 1610 may meter a predetermined volume or flow rate of ingredient from the ingredient source 1602 to the nozzle 512. The positive displacement pump 1610 may be a piston pump, controlled gear pump, peristaltic pump, nutating pump, diaphragm pump, or other such positive displacement pump for metering a fixed volume of flow rate of a fluid with each cycle of the pump.

The fluidic circuit 1600 may optionally include a sold-out sensor 1604 for detecting when the ingredient source 1602 is empty. When the ingredient source 1602 is remotely located from the beverage dispenser 504, the fluidic circuit 1600 may also optionally include an auxiliary pump 1606 for providing a pressurized supply of the beverage ingredient to the beverage dispenser 504. Within or immediately adjacent to the beverage dispenser 504, the fluidic circuit 1600 may include a pressure regulator 1608 such that the inlet of the positive displacement pump 1610 receives a lower or zero pressure supply of beverage ingredient. The fluidic circuit 1600 may also optionally include a shut-off valve 1612 that is configured to remain closed when an ingredient is not being dispensed so as to prevent beverage ingredient from dripping from the nozzle 512.

FIG. 17 illustrates an exemplary fluidic circuit 1700 with a static mechanical flow control 1708 suitable for implementing the several embodiments of the disclosure. The static mechanical flow control 1708 receives a pressurized beverage ingredient from an ingredient source 1702 and provides a fixed flow rate of the beverage ingredient to the nozzle 512. The static mechanical flow control 1708 may be calibrated with a set screw for configuring the flow rate of the static mechanical flow control 1708. A shut-off valve 1710 downstream of the static mechanical flow control 1708 may be actuated to open and close in order to dispense or prevent dispensing the beverage ingredient from the nozzle 512.

The ingredient source 1702 may be a micro-ingredient source or a macro-ingredient source housed in the ingredient matrix 524 of the beverage dispenser 504, remote from the beverage dispenser 504 in the front room (e.g., adjacent to the beverage dispenser 504 or under a counter on which the beverage dispenser 504 is located), or located in the back room. The ingredient source 1702 may also be the municipal water supply 536 or other pressurized ingredient source. When the ingredient source 1702 is not pressurized, the fluidic circuit 1700 may include a pump 1706 for pressurizing the beverage ingredient from the ingredient source 1702. The pump 1706 may be any pump suitable for pressurizing the beverage ingredient from the ingredient source 1702, such as a BIB pump, $CO_2$ driven pump, controlled gear pump, or positive displacement pump. The fluidic circuit 1700 may also optionally include a sold-out sensor 1704 for detecting when the ingredient source 1702 is empty.

FIG. 18 illustrates an exemplary fluidic circuit 1800 with a dynamic mechanical flow control 1808, a flow meter 1810, and a shut-off valve 1812 suitable for implementing the several embodiments of the disclosure. The dynamic mechanical flow control 1808 receives a pressurized beverage ingredient from an ingredient source 1802 and provides an adjustable flow rate of the beverage ingredient to the nozzle 512. The dynamic mechanical flow control 1808 may include a variable sized orifice that adjusts to dynamically change the flow rate of the beverage ingredient supplied to the nozzle 512 based on control signals provided by the one or more controllers 520. A flow meter 1810 downstream of the dynamic mechanical flow control 1808 measures a flow rate of the beverage ingredient being supplied by the dynamic mechanical flow control 1808 and provides a feedback loop to the dynamic mechanical flow control 1808 for controlling the variable sized orifice. A shut-off valve 1812 downstream of the dynamic mechanical flow control 1808 may be actuated to open and close in order to dispense or prevent dispensing the beverage ingredient from the nozzle 512.

The ingredient source 1802 may be a micro-ingredient source or a macro-ingredient source housed in the ingredient matrix 524 of the beverage dispenser 504, remote from the beverage dispenser 504 in the front room (e.g., adjacent to the beverage dispenser 504 or under a counter on which the beverage dispenser 504 is located), or located in the back room. The ingredient source 1802 may also be the municipal water supply 536 or other pressurized ingredient source. When the ingredient source 1802 is not pressurized, the fluidic circuit 1800 may include a pump 1806 for pressurizing the beverage ingredient from the ingredient source 1802. The pump 1806 may be any pump suitable for pressurizing the beverage ingredient from the ingredient source 1802, such as a BIB pump, $CO_2$ driven pump, controlled gear pump, or positive displacement pump. The fluidic circuit 1800 may also optionally include a sold-out sensor 1804 for detecting when the ingredient source 1802 is empty.

While the components of the fluidic circuits 1600-1800 are shown in a particular order in FIGS. 16-18, any order of the components described above may be used. For example, the shut-off valve 1812 may be upstream of the flow meter 1810. Other variations are readily recognizable by those of ordinary skill in the art. Additionally, one or more heat exchangers (not shown) may be used at any location in the fluidic circuits of FIGS. 16-18. The heat exchanger may include an ice bin, water bath, cold plate, or remote recirculation system.

Figure 19:
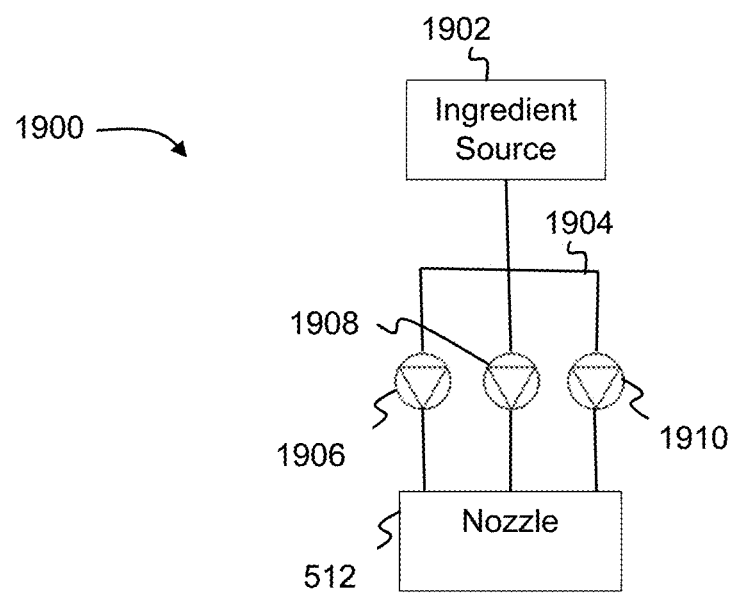
FIG. 19 illustrates an exemplary fluidic circuit with a plurality of independently controlled paths from a single ingredient source suitable for implementing the several embodiments of the disclosure.

FIG. 19 illustrates an exemplary fluidic circuit 1900 with a plurality of independently controlled paths from a single ingredient source 1902 to the nozzle 512 suitable for implementing the several embodiments of the disclosure. The fluidic circuit 1900 includes a manifold 1904 for supplying beverage ingredient to each of the independently controlled paths. Each path includes a pumping or metering device 1906, 1908, 1910 for supplying beverage ingredient from the ingredient source 1902 to the nozzle 512. The pumping or metering devices 1906, 1908, 1910 may be configured as any of the fluidic circuits 1600-1800 shown in FIGS. 16-18. By having multiple independent paths from the ingredient source 1902 to the nozzle 512, a larger range of flow rates are possible than using any one of the pumping or metering devices 1906, 1908, 1910. For example, for a first flow rate of beverage ingredient from the ingredient source, only one of the pumping or metering devices 1906, 1908, 1910 may be activated. For a second flow rate of the beverage ingredient from the ingredient source, a plurality of the pumping or metering devices 1906, 1908, 1910 may be activated.

Figure 20:
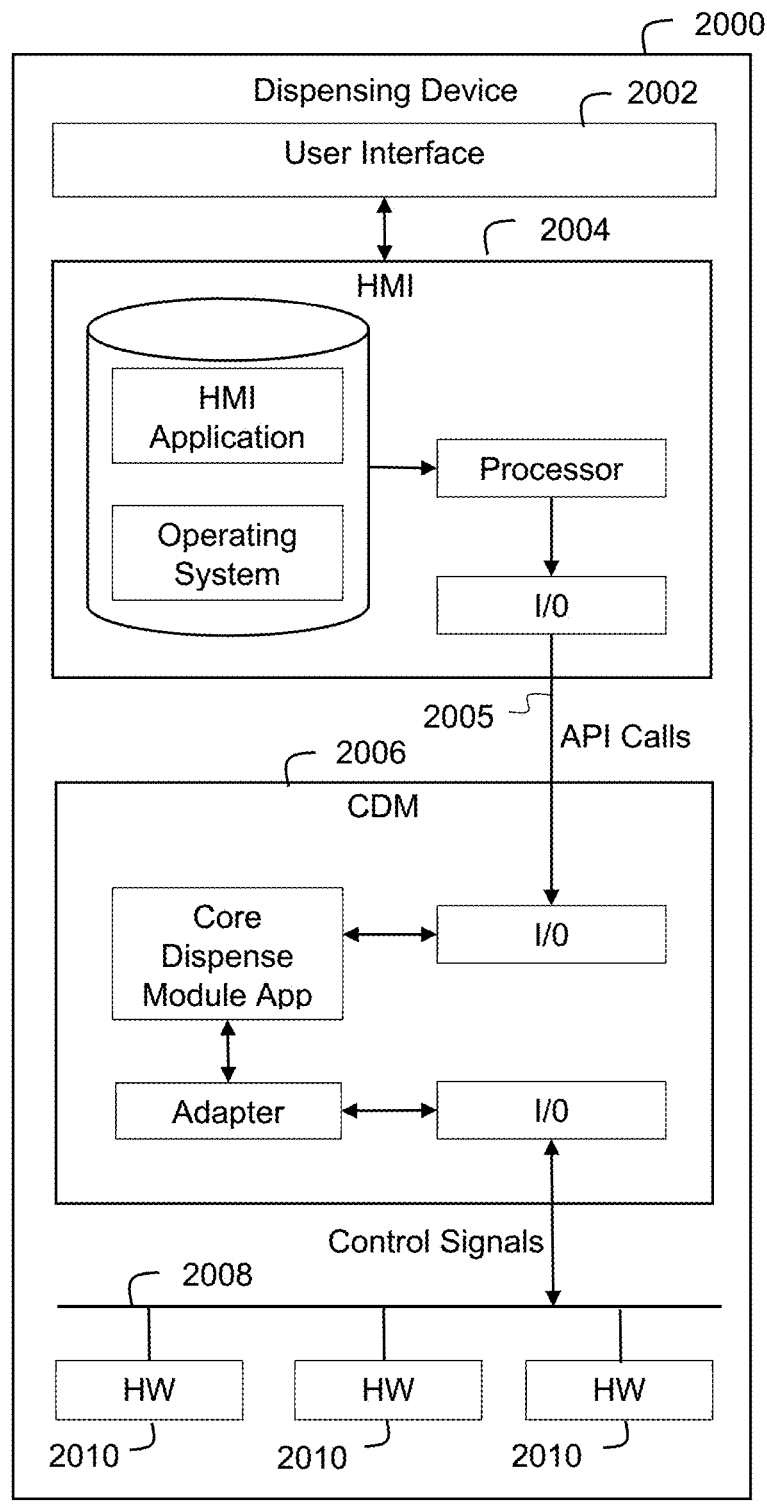
FIG. 20 illustrates an exemplary block diagram of a control architecture for a beverage dispenser suitable for implementing the several embodiments of the disclosure.

FIG. 20 illustrates an exemplary block diagram of a control architecture 2000 that may be used to control the beverage dispenser 504 suitable for implementing the several embodiments of the disclosure. As shown in FIG. 20, control architecture 2000 may comprise a core dispense module (CDM) 2006, a human machine interface (HMI) module 2004, a user interface (UI) 2002, and a machine bus (MBUS) 1005. HMI 2004 may connect to or otherwise interface and communicate with at least one external device (e.g., mobile device 552 or POS 554) being external to beverage dispenser 504. HMI 2004 may also control and update display screens on UI 2002. CDM 2006 may control flows from a plurality of pumps and/or valves 2010 in beverage dispenser 504 according to a recipe to mix and dispense a product (e.g., a beverage) from beverage dispenser 504. In some implementations the CDM 2006 and the HMI 2004 may be integrated together as a single integrated system that performs the operations of both the HMI 2004 and the CDM 2006.

Beverage ingredients (e.g., micro-ingredients, macro-ingredients, and/or diluents) may be combined to dispense various products that may include beverages or blended beverages (i.e., finished beverage products) from beverage dispenser 504. However, beverage dispenser 504 may also be configured to dispense beverage components individually.

An example of control architecture 2000 for beverage dispenser 504 may be described in U.S. Ser. No. 61/987,020, entitled "Dispenser Control Architecture", filed on May 1, 2014, the entirety of which is hereby incorporated by reference. MBUS 1005 may facilitate communication between HMI 2004 and CDM 2006 via one or more API calls. HMI 2004, MBUS 1005, and CDM 2006 may collectively comprise common core components, implemented as hardware or as combination of hardware and software, which may be adapted to provide customized functionality in beverage dispenser 504. Beverage dispenser 504 may further include memory storage and a processor. Examples of UI 2002 may be described in U.S. Ser. No. 61/877,549, entitled "Product Categorization User Interface for a Dispensing Device", filed on Sep. 13, 2013, the entirety of which is hereby incorporated by reference. The UI 2002 may include the user interfaces 400 described above.

UI 2002 may detect what area of a touch screen has been touched by a user (e.g., user 108). In response, UI 2002 may send HMI 2004 data regarding where the touch screen was touched. In response, HMI 2004 may interpret this received data to determine whether to have UI 2002 display a different UI screen or to issue a command to CDM 2006. For example, HMI 2004 may determine that the user touched a portion of the touch screen corresponding to a beverage brand. In response, HMI 2004 may issue a command to CDM 2006 to pour the corresponding beverage brand. In response to receiving the command to pour the corresponding beverage brand, the CDM 2006 in turn issues commands via one or more control buses 2008 to the pumping or metering devices 2010 for the beverage ingredients needed to dispense the beverage brand. Or HMI 2004 may determine that the user touched a portion of the touch screen corresponding to a request for another screen. In response, HMI 2004 may cause UI 2002 to display the requested screen.

In some embodiments, UI 2002 in beverage dispenser 504 may be utilized to select and individually dispense one or more beverages. The beverages may be dispensed as beverage components in a continuous pour operation whereby one or more selected beverage components continue to be dispensed while a pour input is actuated by a user or in a batch pour operation where a predetermined volume of one or more selected beverage components are dispensed (e.g., one ounce at a time). UI 2002 may be addressed via a number of methods to select and dispense beverages. For example, a user may interact with UI 2002 via touch input to navigate one or more menus from which to select and dispense a beverage. As another example, a user may type in a code using an onscreen or physical keyboard (not shown) on beverage dispenser 504 to navigate one or more menus from which to select and dispense a beverage. As a further example, a user may interact with the HMI 2004 via a user interface of an application on the mobile device 552.

UI 2002, which may include a touch screen and a touch screen controller, may be configured to receive various commands from a user (i.e., consumer input) in the form of touch input, generate a graphics output and/or execute one or more operations with beverage dispenser 504 (e.g., via HMI 2004 and/or CDM 2006), in response to receiving the aforementioned commands. A touch screen driver in HMI 2004 may be configured to receive the consumer or customer inputs and generate events (e.g., touch screen events) that may then be communicated through a controller to an operating system of HMI 2004.

Beverage dispenser 504 may be in communication with one or more external device (e.g., mobile device 552 or POS 554). In some embodiments, the communication between beverage dispenser 504 and the external device may be accomplished utilizing any number of communication techniques including, but not limited to, near-field wireless technology such as BLUETOOTH, Wi-Fi and other wireless or wireline communication standards or technologies, via a communication interface.

Figure 21:
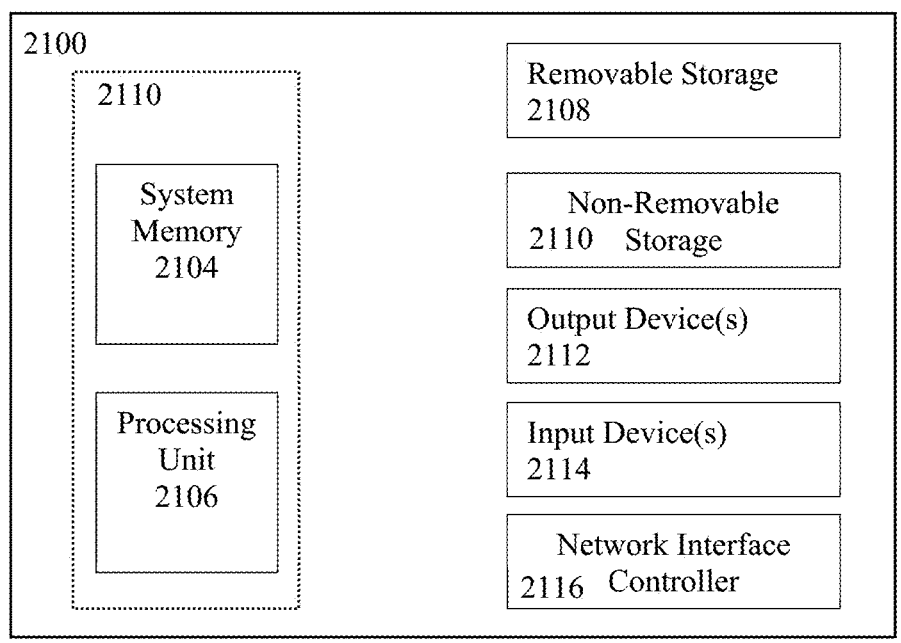
FIG. 21 illustrates an exemplary computer system suitable for implementing the several embodiments of the disclosure.

FIG. 21 illustrates an exemplary computer system 2100 suitable for implementing the several embodiments of the disclosure. For example, one or more components or controller components of the beverage dispenser 504 may be implemented as the computer system 2100. In some implementations, one or both of the HMI 2004 and the CDM 2006 may be implemented as the computer system 2100. In various implementations, one or more of the mobile device 122, server 128, or components of the beverage vendor 102 may be implemented as the computer system 2100.

It should be appreciated that the logical operations described herein with respect to the various figures may be implemented (1) as a sequence of computer implemented acts or program modules (i.e., software) running on a computing device (e.g., the computing device described in FIG. 21), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 21, an example computing device 2100 upon which embodiments of the invention may be implemented is illustrated. For example, each of the content source, key server, segmentations servers, caching servers, and client devices described herein may each be implemented as a computing device, such as computing device 2100. It should be understood that the example computing device 2100 is only one example of a suitable computing environment upon which embodiments of the invention may be implemented. Optionally, the computing device 2100 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In some embodiments, the computing device 2100 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some embodiments, virtualization software may be employed by the computing device 2100 to provide the functionality of a number of servers that is not directly bound to the number of computers in the computing device 2100. For example, virtualization software may provide twenty virtual servers on four physical computers. In some embodiments, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In its most basic configuration, computing device 2100 typically includes at least one processing unit 2106 and system memory 2104. Depending on the exact configuration and type of computing device, system memory 2104 may be volatile (such as random-access memory (RAM)), non-volatile (such as read-only memory (ROM), flash memory, etc.), or some combination of the two. The processing unit 2106 may be a standard programmable processor that performs arithmetic and logic operations necessary for operation of the computing device 2100. While only one processing unit 2106 is shown, multiple processors may be present. Thus, while instructions may be discussed as executed by a processor, the instructions may be executed simultaneously, serially, or otherwise executed by one or multiple processors. The computing device 2100 may also include a bus or other communication mechanism for communicating information among various components of the computing device 2100.

Computing device 2100 may have additional features/ functionality. For example, computing device 2100 may include additional storage such as removable storage 2108 and non-removable storage 2110 including, but not limited to, magnetic or optical disks or tapes. Computing device 2100 may also contain network connection(s) 2116 that allow the device to communicate with other devices such as over the communication pathways described herein. The network connection(s) 2116 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/ or other air interface protocol radio transceiver cards, and other well-known network devices. Computing device 2100 may also have input device(s) 2114 such as a keyboard, keypads, switches, dials, mice, track balls, touch screens, voice recognizers, card readers, paper tape readers, or other well-known input devices. Output device(s) 2112 such as a printer, video monitors, liquid crystal displays (LCDs), touch screen displays, displays, speakers, etc. may also be included. The additional devices may be connected to the bus in order to facilitate communication of data among the components of the computing device 2100. All these devices are well known in the art and need not be discussed at length here.

The processing unit 2106 may be configured to execute program code encoded in tangible, computer-readable media. Tangible, computer-readable media refers to any media that is capable of providing data that causes the computing device 2100 (i.e., a machine) to operate in a particular fashion. Various computer-readable media may be utilized to provide instructions to the processing unit 2106 for execution. Example tangible, computer-readable media may include, but is not limited to, volatile media, non-volatile media, removable media, and non-removable media implemented in any method or technology for storage of information such as computer readable instructions, data structures, program modules or other data. System memory 2104, removable storage 2108, and non-removable storage 2110 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 2106 may execute program code stored in the system memory 2104. For example, the bus may carry data to the system memory 2104, from which the processing unit 2106 receives and executes instructions. The data received by the system memory 2104 may optionally be stored on the removable storage 2108 or the non-removable storage 2110 before or after execution by the processing unit 2106.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A beverage vendor, comprising:
    a nozzle configured to dispense one or more beverage ingredients of a beverage;
    a user interface screen configured to simultaneously display a plurality of selectable beverage icons;
    a controller configured to receive a selection of a first selectable beverage icon of the plurality of selectable beverage icons associated with the beverage, wherein upon the selection of the first selectable beverage icon, the user interface screen is configured to dynamically update the first selectable beverage icon by displaying a cost per amount of the beverage in the first selectable beverage icon; and
    a payment module configured to receive a payment for a pouring session, wherein responsive to receiving the payment, the user interface screen is further configured to provide a selectable pour icon on the user interface screen in proximity to a beverage icon with a visual appearance substantially identical to the first selectable beverage icon,
    wherein upon a selection of the selectable pour icon, the user interface screen is further configured to dynamically update the first selectable beverage icon by displaying a dispense gauge in the first selectable beverage icon,
    wherein the controller is further configured to activate a pumping or metering device upon the selection of the selectable pour icon to dispense the beverage from the nozzle, and
    wherein the dispense gauge includes a periodically updating display of a current total amount of product dispensed and/or a current total cost of the pouring session.

2. The beverage vendor of claim 1, wherein the selectable pour icon is provided on the user interlace screen from activation of a locked pour icon that was unavailable for selection.

3. The beverage vendor of claim 1, wherein the selectable pour icon is not present on the user interface screen until receiving the payment.

4. The beverage vendor of claim 1, wherein the dispense gauge is updated in real-time to reflect the current value for the total amount and/or the total cost as the selectable pour button is held down.

5. The beverage vendor of claim 1, wherein the controller is further configured to receive a selection of a second selectable beverage icon of the plurality of selectable beverage icons during the pouring session,
    wherein upon selection of the second selectable beverage icon, the user interface screen is further configured to display the dispense gauge in the second selectable beverage icon.

6. A method of dispensing a beverage from a beverage vendor, the method comprising
    simultaneously displaying a plurality of selectable beverage icons on a user interface screen of the beverage vendor;
    receiving, by a controller of the beverage vendor, a selection of a first selectable beverage icon of the plurality of selectable beverage icons;
    upon receiving the selection of the first selectable beverage icon, dynamically updating the first selectable beverage icon on the user interface screen by displaying a cost per amount of a beverage associated with the first selectable beverage icon in the first selectable beverage icon;
    receiving a payment for a pouring session on the beverage vendor;
    providing a selectable pour icon on the user interface screen in response to receiving the payment, wherein the selectable pour icon is in proximity to a beverage icon with a visual appearance substantially identical to the first selectable beverage icon;
    upon receiving the selection of the selectable pour icon, dynamically updating the first selectable beverage icon on the user interface screen by displaying a dispense gauge in the first selectable beverage icon, wherein the dispense gauge includes a total amount of product dispensed and/or a total cost of the pouring session;
    supplying a beverage ingredient from an ingredient source to a nozzle on the beverage vendor upon receiving the selection of the selectable pour icon to dispense the beverage from the nozzle; and
    periodically updating the dispense gauge to show a current total amount of product dispensed and/or a current total cost of the pouring session.

7. The method of claim 6, wherein providing the selectable pour icon comprises activating a locked pour icon on the user interface screen that is unavailable for selection.

8. The method of claim 6, wherein providing the selectable pour icon comprises displaying the selectable pour icon on the user interface screen only after receiving the payment.

9. The method of claim 6, wherein periodically updating the dispense gauge further comprising:
    updating the dispense gauge in real-time to reflect the current value for the total amount and/or the current total cost as long as the selectable pour button is selected.

10. The method of claim 8, further comprising:
receiving a selection of a second selectable beverage icon of the plurality of selectable beverage icons during the pouring session; and
upon selection of the second selectable beverage icon, displaying the dispense gauge in the second selectable beverage icon.

\* \* \* \* \*